United States Patent
Kim et al.

(10) Patent No.: US 9,996,201 B2
(45) Date of Patent: Jun. 12, 2018

(54) TOUCH PANEL HAVING IMPROVED VISIBILITY AND METHOD OF MANUFACTURING THE SAME

(71) Applicant: Samsung Electronics Co., Ltd., Suwon-si, Gyeonggi-do (KR)

(72) Inventors: Myung-Gon Kim, Hwaseong-si (KR); Jong-Woo Kim, Suwon-si (KR); Hyon-Myong Song, Suwon-si (KR); Duck-Yong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 14/634,172

(22) Filed: Feb. 27, 2015

(65) Prior Publication Data

US 2015/0212626 A1   Jul. 30, 2015

Related U.S. Application Data

(63) Continuation-in-part of application No. 13/763,115, filed on Feb. 8, 2013.

(30) Foreign Application Priority Data

Feb. 23, 2012 (KR) ........................ 10-2012-0018264
Aug. 20, 2012 (KR) ........................ 10-2102-0090487

(51) Int. Cl.
G06F 3/041 (2006.01)
G06F 3/044 (2006.01)
H04M 1/02 (2006.01)

(52) U.S. Cl.
CPC .............. *G06F 3/044* (2013.01); *G06F 3/041* (2013.01); *H04M 1/0268* (2013.01); *G06F 2203/04103* (2013.01); *H04M 2250/22* (2013.01); *Y10T 156/10* (2015.01)

(58) Field of Classification Search
CPC .......... G06F 2203/04103; G06F 3/041; G06F 3/044; H04M 1/0268; H04M 2250/22; Y10T 156/10
See application file for complete search history.

(56) References Cited

U.S. PATENT DOCUMENTS

| | | |
|---|---|---|
| 6,743,488 B2 | 6/2004 | Memarian et al. |
| 2006/0240232 A1 | 10/2006 | Faris |
| 2008/0026215 A1 | 1/2008 | Wan et al. |
| 2008/0220198 A1 | 9/2008 | Tsukahara et al. |
| 2009/0002323 A1 | 1/2009 | Shiroishi et al. |
| 2009/0029151 A1 | 1/2009 | Noguchi et al. |
| 2009/0315849 A1 | 12/2009 | Ito |

(Continued)

FOREIGN PATENT DOCUMENTS

| | | |
|---|---|---|
| CN | 101790712 A | 7/2010 |
| EP | 2 169 520 A2 | 3/2010 |

(Continued)

*Primary Examiner* — Insa Sadio
(74) *Attorney, Agent, or Firm* — Jefferson IP Law, LLP

(57) ABSTRACT

A touch panel having improved visibility is provided. The touch panel includes a window part, at least one ultraviolet (UV) resin layer attached to a bottom surface of the window part, and a display part including a touch sensor film module attached to a bottom surface of the at least one UV resin layer such that the UV resin layer prevents refractions and reflections of light.

24 Claims, 12 Drawing Sheets

(56) References Cited

U.S. PATENT DOCUMENTS

| | | |
|---|---|---|
| 2011/0012839 A1 | 1/2011 | Lin |
| 2011/0012842 A1 | 1/2011 | Lee et al. |
| 2011/0033720 A1 | 2/2011 | Fujita et al. |
| 2011/0109590 A1 | 5/2011 | Park |
| 2011/0279387 A1 | 11/2011 | Kim et al. |
| 2012/0039057 A1* | 2/2012 | Paleczny ................. G06F 3/016 361/807 |
| 2012/0223905 A1 | 9/2012 | Jeon et al. |
| 2012/0314350 A1 | 12/2012 | Choi et al. |

FOREIGN PATENT DOCUMENTS

| | | |
|---|---|---|
| EP | 2 306 278 A1 | 4/2011 |
| JP | 2010-257208 A | 11/2010 |
| KR | 10-2011-0002857 A | 1/2011 |
| WO | 2008/014156 A1 | 1/2008 |
| WO | 2011/159028 A2 | 12/2011 |
| WO | 2011/159028 A3 | 12/2011 |

\* cited by examiner

TOUCH PANEL HAVING IMPROVED VISIBILITY AND METHOD OF MANUFACTURING THE SAME

CROSS-REFERENCE TO RELATED APPLICATION(S)

This application is a continuation-in-part of prior application Ser. No. 13/763,115, filed on Feb. 8, 2013, which claimed the benefit under 35 U.S.C. § 119(a) of a Korean patent application filed on Feb. 23, 2012 in Korean Intellectual Property Office and assigned Serial No. 10-2012-0018264, and a Korean patent application filed on Aug. 20, 2012 in the Korean Intellectual Property Office and assigned Serial No. 10-2012-0090487, the entire disclosures of each of which are hereby incorporated by reference.

TECHNICAL FIELD

The present disclosure relates to an electronic device. More particularly, the present disclosure relates to a portable electronic device.

BACKGROUND

In general, the visibility of portable communication devices has improved due to remarkable developments in multimedia and display technologies. Accordingly, touch panels are increasingly employed in portable communication devices.

In the case of a general resistive touch sensor, since the touch panel can provide location information only when two sensors contact each other as a result of touch pressure, a film needs to be attached to a window provided in a portable communication device. In contrast, a capacitive touch panel provides the location of a point where electric charges are discharged during a touch.

A capacitive touch panel will be described in more detail as follows.

FIG. 1 is a view illustrating a configuration of a touch panel including a window according to the related art Referring to FIG. 1, the capacitive touch panel 1 includes a window part 2 formed of reinforced glass, a polymer film layer 3 attached to a bottom surface of the window part 2, a pattern ultraviolet (UV) resin layer 4 applied to an lower portion of the polymer film layer 3, a touch sensor film module 5 attached to a bottom surface of the pattern UV resin layer 4, and a display part, e.g., a Liquid Crystal Display (LCD) 6 attached to a bottom surface of the touch sensor film module 5.

The pattern UV resin layer 4 is applied to the polymer film layer 3 to form a pattern 7. The pattern 7 is formed in the applied pattern UV resin layer 4, and the pattern 7 is deposited 8 and printed 9. Bubbles 1c may be generated during deposition or printing. The polymer film layer 3 is attached to the window part 2 by using, e.g., an Optically Clear Adhesive (OCA) (not illustrated).

In FIG. 1, the touch sensor film module 4 is attached to a bracket 6a of the display part (e.g., LCD) 6 through a double-sided tape 1a. Then, an air layer 1b is provided between the touch sensor film module 4 and the display part (e.g., LCD) 6 to protect the display part (e.g., LCD) 6 from deflection of the window part 2.

The configuration of the touch panel is disclosed in Korean patent application Laid-Open No. 10-2011-002857 (issued on Jan. 10, 2011).

However, when light passes through different media, refractions and reflections generally occur in the touch panel due to differences in the refractivity of the different media.

Thus, in the capacitive touch panel according to the related art, light sequentially passes through the media including the window part, the UV resin layer, the touch sensor film module, the air layer, and the display part (e.g., LCD), and thus refractions and reflections of light occur whenever the media are changed, lowering the visibility of the product.

In addition to the above problems in the related art, if an existing touch panel is dropped, the UV resin layer is apt to be cracked by a hard primer layer provided in the polymer film layer due to the impact. Also, in the related art, an impact to a side of the touch panel may transfer to the touch panel.

Therefore, a need exists for a method and apparatus for adding another UV resin layer for minimizing refractions and reflections of light to the existing resin layer. Additionally, a need exists for a soft primer layer to prevent the UV resin layer from being cracked due to the impact of, e.g., the touch panel being dropped. A further need also exists for a space to be provided in order to avoid damage from an impact to a side surface of the touch panel.

The above information is presented as background information only to assist with an understanding of the present disclosure. No determination has been made, and no assertion is made, as to whether any of the above might be applicable as prior art with regard to the present invention.

SUMMARY

Aspects of the present invention are to address at least the above-mentioned problems and/or disadvantages and to provide at least the advantages described below. Accordingly, an aspect of the present invention is to provide a touch panel having improved visibility, that is, in which a transmittance of a product is increased and a visibility of a product is enhanced, by additionally configuring a second ultraviolet (UV) resin layer for preventing refractions and reflections of light in a first UV resin layer, and a method of manufacturing the same.

In accordance with an aspect of the present invention, a touch panel having improved visibility is provided. The touch panel includes a window part, at least one ultraviolet (UV) resin layer attached to a bottom surface of the window part, and a display part including a touch sensor film module attached to a bottom surface of the at least one UV resin layer, wherein the UV resin layer prevents refractions and reflections of light.

In accordance with another aspect of the present invention, a touch panel having improved visibility is provided. The touch panel includes a window part including a polymer film layer, a first UV resin layer attached to a bottom surface of the polymer film layer, a second UV resin layer attached to a bottom surface of the first UV resin layer to prevent refractions and reflections of light, and a touch sensor film module attached to a bottom surface of the second UV resin layer.

In accordance with another aspect of the present invention, a method of manufacturing a touch panel having improved visibility is provided. The method includes manufacturing a window part, attaching a polymer film layer to a bottom surface of the window part, attaching a first UV resin layer to a bottom surface of the polymer film layer, attaching a second UV resin layer for preventing refractions and reflections of light to a bottom surface of the first UV resin layer, and attaching a display part including a touch sensor film module to a bottom surface of the second UV resin layer.

In accordance with another aspect of the present invention, a touch panel having improved visibility is provided. The touch panel includes a window part including a polymer film layer, a first UV resin layer attached to a bottom surface of the polymer film layer, a second UV resin layer attached to a bottom surface of the first UV resin layer to prevent refractions and reflections of light, and a display part including a touch sensor film module attached to a bottom surface of the second UV resin layer, wherein the polymer film layer includes a bonding layer, a film body layer formed on a bottom surface of the bonding layer, and a soft primer layer formed on a bottom surface of the film body layer.

In accordance with another aspect of the present invention, a touch panel having improved visibility is provided. The touch panel includes a window part including a polymer film layer, a first UV resin layer attached to a bottom surface of the polymer film layer, a second UV resin layer attached to a bottom surface of the first UV resin layer to prevent refractions and reflections of light, and a display part including a touch sensor film module attached to a bottom surface of the second UV resin layer, wherein the polymer film layer and the first UV resin layer are formed to be smaller than the window part and a bracket formed in the display part.

In accordance with another aspect of the present invention, a method of manufacturing a touch panel having improved visibility is provided. The method includes manufacturing a window part, attaching a polymer film layer to a bottom surface of the window part, attaching a first UV resin layer through a soft primer layer formed in the polymer film layer, attaching a second UV resin layer for preventing refractions and reflections of light to a bottom surface of the first UV resin layer, and attaching a display part including a touch sensor film module to a bottom surface of the second UV resin layer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 3:
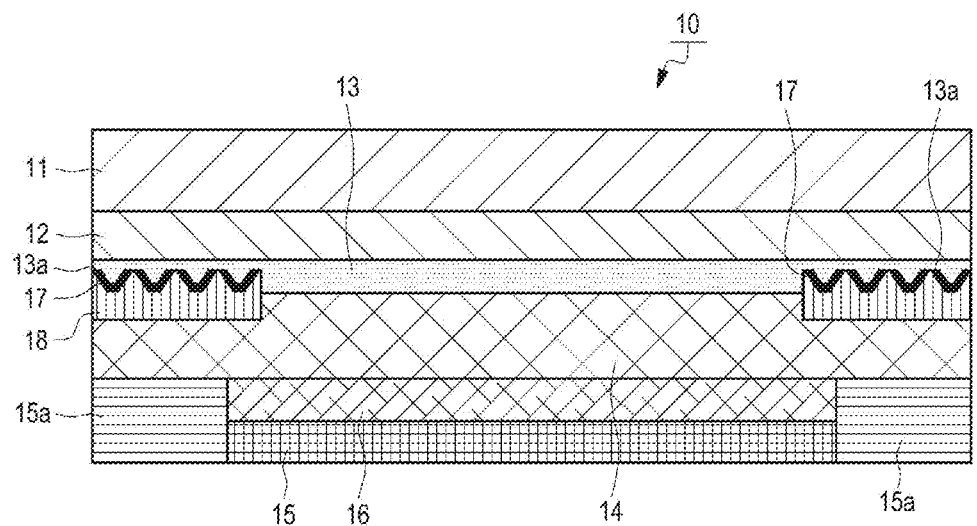
FIG. 3 is a view illustrating a coupled state of the touch panel having improved visibility according to the first exemplary embodiment of the present invention.
Figure 4:
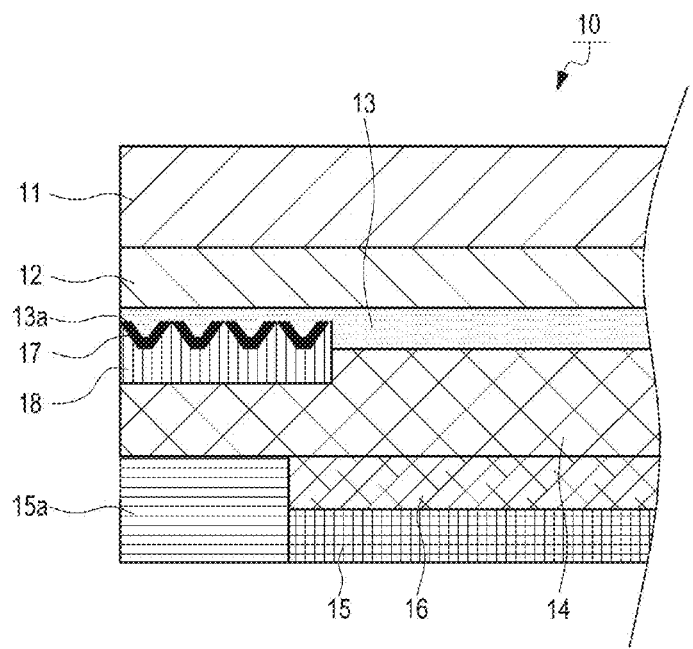
FIG. 4 is an enlarged view illustrating the touch panel having improved visibility according to the first exemplary embodiment of the present invention.

FIG. 3 is a view illustrating a coupled state of the touch panel having improved visibility according to the first exemplary embodiment of the present invention. FIG. 4 is an enlarged view illustrating the touch panel having improved visibility according to the first exemplary embodiment of the present invention.

Figure 2:
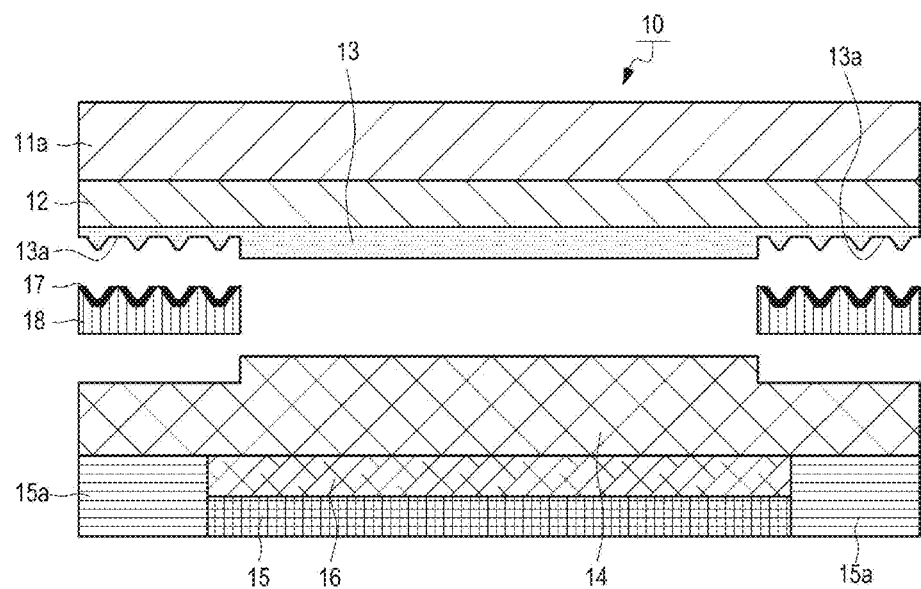
FIG. 2 is an exploded view illustrating a touch panel having improved visibility according to a first exemplary embodiment of the present invention.

Referring to FIGS. 2 and 3, the touch panel 10 includes a window part 11 including a polymer film layer 12, and a display part 15 including first and second ultraviolet (UV) resin layers 13 and 14 and a touch sensor film module 16. The polymer film layer 12 is attached to a bottom surface of the window part 11 so that the first UV resin layer 13 to be described below may be attached to the polymer film layer 12. The UV resin layer 13 includes the second UV resin layer 14 to be described below, and is attached to a bottom surface of the polymer film layer 12 to transfer light. The second UV resin layer 14 receives light having passed through the first UV resin layer 13, and is attached to a bottom surface of the first UV resin layer 13 to prevent refractions and reflections of the transferred light. The touch sensor film module 16 and a bracket 15a formed in the display part 15 are attached to the second UV resin layer 14 together.

Further referring to FIG. 2, a pattern may be formed in the first UV resin layer. The pattern 13a may be one of a decoration pattern, a three-dimensional pattern formed with fine hair lines, and a molding pattern. Here, the pattern 13a may be a pattern other than the decoration pattern, the three-dimensional pattern, and the molding pattern (for example, a repeated pattern).

In addition, post-processes such as deposition 17 and printing 18 may be performed on the pattern. In an exemplary implementation, the post processes may be used to realize a color and a metallic feeling.

In exemplary embodiments, the thickness of the polymer film layer 12 may be between 0.05 mm and 0.15 mm. However, the thickness of the polymer film layer 12 may be less than 0.05 mm or more than 0.15 mm.

In exemplary embodiments, the material of the window part 11 may be one of tempered glass and reinforced plastic. However, the material of the window part 11 may be a material other than tempered glass and reinforced plastic.

In exemplary embodiments, the material of the polymer film layer 12 may be one of Polyethylene Terephthalate (PET), Poly Methyl Methacrylate (PMMA), and Poly Carbonate (PC). However, the material of the polymer film layer 12 may be a material other than the above-listed materials.

In exemplary embodiments, the display part 15 may be one of a Liquid Crystal Display (LCD), a Light Emitting Diode (LED), and an Active Matrix Organic Light Emitting Diode (AMOLED). However, the display part may be a display part other than the above-listed display parts.

Further referring to FIG. 3, in describing the second UV resin layer 14 in more detail, as illustrated in FIG. 3, the touch sensor film module 16 and the bracket 15a formed in the display part 15 may be attached to the second UV resin layer 14 together.

Here, the second UV resin layer 14 may be in a liquid state.

FIG. 4 is an enlarged view illustrating the touch panel having improved visibility according to an exemplary embodiment of the present invention.

Referring to FIG. 4, the polymer film layer 12 is attached to a bottom surface of the window part 11 by using an Optical Clean Adhesive (OCA) (not illustrated). The first UV resin layer 13 is formed on a bottom surface of the polymer film layer 12, and a pattern is formed in the first UV resin layer 13. The pattern 13a is a decoration pattern, and the decoration pattern is a repeated design pattern including fine hair lines. Post-processes such as deposition 17 and printing 18 are performed on the pattern 13a to realize a color and a metallic feeling. In this state, the second UV resin layer 14 in a liquid state is formed on a bottom surface of the first UV resin layer 13.

The touch sensor film module 16 and the bracket of the display part 15 are attached to the second UV resin together.

Further referring to FIG. 4, light is introduced into the window part 11, and the introduced light passes through the polymer film layer 12. Then, light is refracted and reflected whenever the light passes through the window part 11 and the polymer film layer 12.

The light having passed through the polymer film layer 12 is introduced into the first UV resin layer 13 and is refracted and reflected at the same time.

The light having passed through the first UV resin layer 13 passes the second UV resin layer 14 of the same kind, which prevents refractions and reflections.

That is, the light is refracted and reflected when passing through the first UV resin layer 13, and is introduced into the second UV resin layer 14 as it is. The introduced light passes through the second UV resin layer 14 as it is, and not being refracted and reflected. The second UV resin layer 14 passes the light without refracting and reflecting it, and the light is then transferred to the display part 15 after passing through the touch sensor film module 16.

Since the light having passed the first UV resin layer 13 passes the second UV resin layer 14 as it is and not being refracted and reflected, screen visibility can be improved, and screen degradation of the display part 15 due to a reduction in the transmittance of light can be addressed at the same time.

That is, by configuring the second UV resin layer 14 for additionally preventing refractions and reflections of light in the first UV resin layer 13, the visibility of a product can be enhanced, the clarity of the product can be enhanced, and the design of the product can become more appealing.

Figure 1:
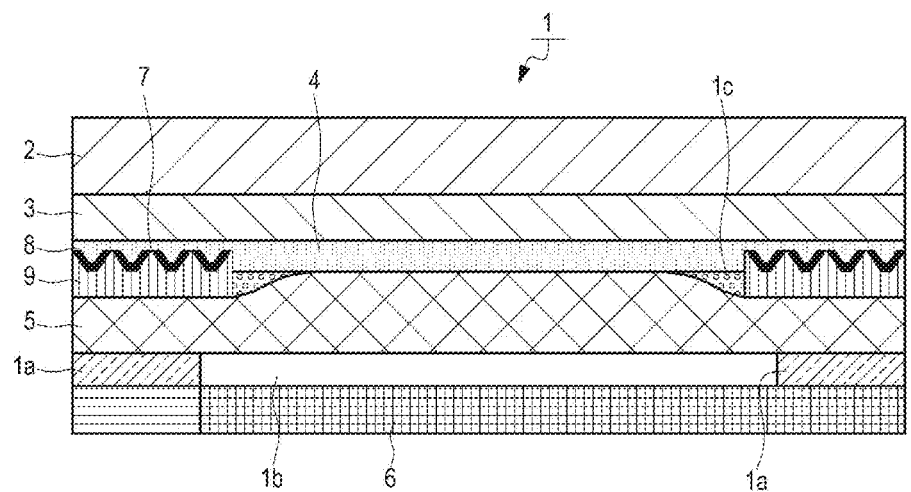
FIG. 1 is a view illustrating a configuration of a touch panel including a window according to the related art.

According to the related art, when a film-type touch sensor film module is attached to a bottom surface of a UV resin layer having a pattern, an attached space is formed between the pattern and the touch sensor film module, and bubbles 1c (see FIG. 1) are generated in the space. Accordingly, a defect rate of the product increases.

Thus, in order to address these disadvantages, by applying the second UV resin layer 14 in a liquid state to the first UV hardening resin layer 13 having a pattern 13, a space formed by a pattern according to the related art can be prevented and bubbles 1c (see FIG. 1) generated in the space are prevented. Thus, the defect rate of the product due to the bubbles generated can be reduced.

In addition, although the bracket of the display part 15 and the touch sensor film module 16 are attached to each other by using a double-sided tape 1a (see FIG. 1) to form an air layer in the related art, the attached area of the double-sided tape is so small that the display part 15 and the touch sensor film module 16 can be easily separated from each other.

Thus, in order to address the disadvantages, in the second UV resin layer 14, the attached area may be made wider so that the touch sensor film module 16 and the display part 15 can be attached to each other so as to enhance an attaching force of the product.

Touch panel 10 (see FIG. 2), according to an exemplary embodiment of the present invention, is applicable to an electronic device (not illustrated). However, the present invention is not necessarily limited to electronic devices and may be applied to various types of electronic devices.

Examples of various types of electronic devices according to exemplary embodiments of the present invention may include all information communication devices and multimedia devices such as an MP3 player, a Portable Multimedia Player (PMP), a navigation system, a gaming device, a laptop computer, an advertising panel, a television (TV), a digital broadcasting player, a Personal Digital Assistant (PDA), and a smart phone, and application devices thereof, including all mobile communication terminals operated based on communication protocols corresponding to various communication systems.

Hereinafter, a method of manufacturing the touch panel having improved visibility according to an exemplary embodiment of the present invention will be described in detail.

Figure 5:
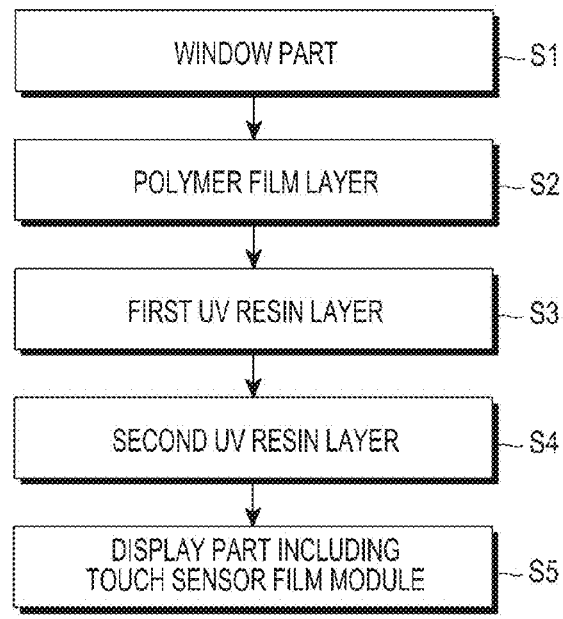
FIG. 5 is a flowchart illustrating a method of manufacturing a touch panel having improved visibility according to the first exemplary embodiment of the present invention.

FIG. 5 is a view illustrating a method of manufacturing the touch panel having improved visibility according to an exemplary embodiment of the present invention.

Referring to FIG. 5, a method of manufacturing the touch panel 10 having improved visibility will be described. In step S1, the window part 11 formed of tempered glass is manufactured.

In step S2, the polymer film layer 12 is attached to a bottom surface of the window part 11 manufactured in step S1 by using an Optical Clean Adhesive (OCA) (not illustrated).

In step S3, the first UV resin layer 13 is attached to a bottom surface of the polymer film layer 12 from step S2.

The decoration pattern 13a is formed in the first UV resin layer 13, and the decoration pattern 13a is processed through deposition 17 and printing 18.

In step S4, the second UV resin layer 14 for preventing refractions and reflections of light is attached to a bottom surface of the first UV resin layer 13 from step S3.

In step S5, the display part 15 including the touch sensor film module 16 is attached to a bottom surface of the second UV resin layer 14 from step S4.

The first UV resin layer 13 corresponds to a pattern UV resin layer for forming a pattern, and the second UV resin layer 14 corresponds to an attaching UV resin layer for attaching the touch sensor film module 16 and the display part 15 together.

Figure 6:
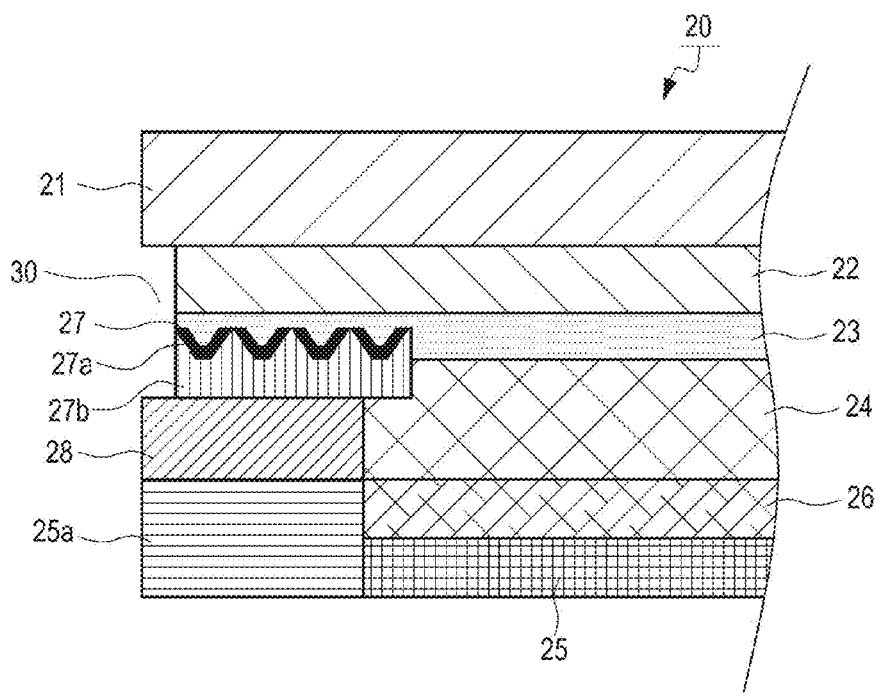
FIG. 6 is a view illustrating a coupled state of a touch panel having improved visibility according to a second exemplary embodiment of the present invention.
Figure 7:
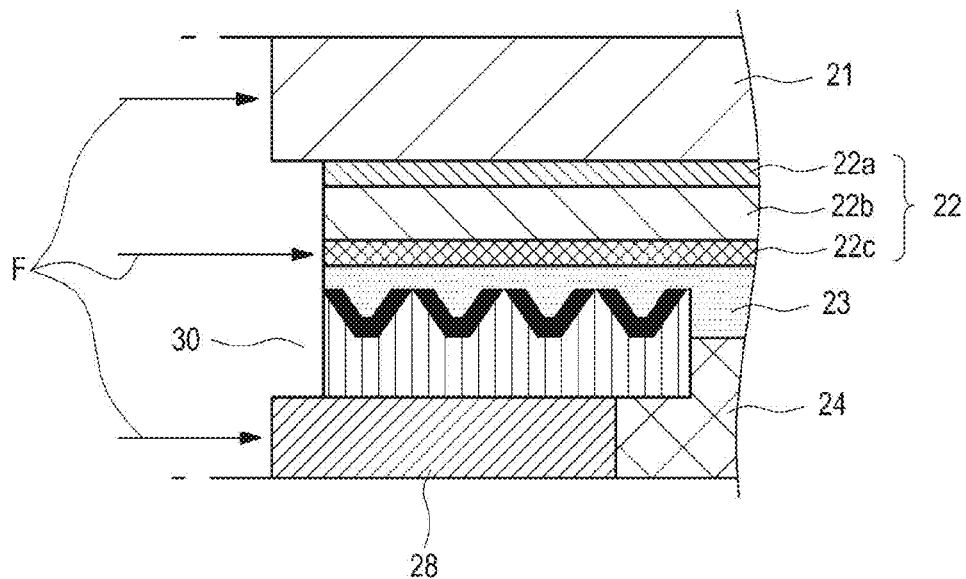
FIG. 7 is an enlarged view illustrating a polymer film layer of the touch panel having improved visibility according to the second exemplary embodiment of the present invention.

FIG. 6 is a view illustrating a coupled state of a touch panel having improved visibility according to a second exemplary embodiment of the present invention. FIG. 7 is an enlarged view illustrating a polymer film layer of the touch panel having improved visibility according to the second exemplary embodiment of the present invention.

Referring to FIGS. 6 and 7, the touch panel 20 includes a window part 21 including a polymer film layer 22, a display part 25 including first and second UV resin layers 23 and 24 and a touch sensor film module 26. The polymer film layer 22 is attached to a bottom surface of the window part 21 so that the first UV resin layer 23 to be described below may be attached to the polymer film layer 22. The first UV resin layer 23 includes the second UV resin layer 24 to be described below, and is attached to a bottom surface of the polymer film layer 22 to transfer light. The second UV resin layer 24 receives light having passed through the first UV resin layer 23, and is attached to a bottom surface of the first UV resin layer 23 to prevent refractions and reflections of the transferred light. The touch sensor film module 26 is attached to a bottom of the second UV resin layer 24.

In the touch panel 20, by additionally configuring the second UV resin layer 24, refractions and reflections of light caused by use of the first UV resin layer 23, and lowering of the screen quality of the display part 25 due to distortion of a surface of the first UV resin layer 23 and scratches, can be prevented.

A pattern 27 may be formed in the first UV resin layer 23. A bracket 25a formed in the display part 25 is attached to a bottom surface of the pattern 27 by using a double-sided tape 28.

The pattern 27 may be any one of a decoration pattern, a three-dimensional pattern formed with hair lines, a molding pattern, or a lattice pattern. The pattern 27 may also be a pattern other than the disclosed patterns (for example, a repeated pattern).

In addition, post-processes such as deposition 27a and printing 27b may be performed on the pattern 27. In an exemplary implementation, the post processes may be used to realize a color and a metallic feeling, wherein the pattern 27 may be realized on a bottom surface of the polymer film layer 22 through a roller or stamp process.

In describing the polymer film layer 22 with reference to FIG. 7 in more detail, the polymer film layer 22 may include a bonding layer 22a, a film body layer 22b, and a soft primer layer 22c. The bonding layer 22a is formed of an OCA, and the polymer 22 is attached to a bottom surface of the window part 21 by using the optical clear adhesive. The film body layer 22b is formed on a bottom surface of the bonding layer 22a. The soft primer layer 22c is formed on a bottom surface of the film body layer 22b to increase a bonding force with the first UV resin layer 23 and an impact-resistant property.

In exemplary embodiments, a thickness of the bonding layer 22a may be 25 μm to 50 μm. However, a thickness of the bonding layer 22a may be less than 25 μm or more than 50 μm.

A material of the film body layer 22b may be any one of PET, PMMA, and PC. However, the material of the polymer film layer 22 may also be a material other than the above-listed materials.

The primer layer 22c may correspond to a single-layered or multilayered primer layer to increase a bonding force with the first UV resin layer 23 and to add an impact-resistant property.

A hardness of the primer layer 22c may be a pencil hardness of H to B to prevent the first UV resin layer 23 from cracking when an electronic device is dropped.

The polymer film layer 22 may be bonded to the window part 21 through a roller or stamp process.

An upper surface of the window part 21 may correspond to a plane or a shape having a curvature. That is, an upper surface of the window part 21 may be any one of 2.5 D and 3D shapes having a curvature.

The first and second UV resin layers 23 and 24 may be formed of an acrylate or polyurethane material. However, the first and second UV resin layers 23 and 24 may also be a material other than the disclosed materials. A hardness of the first and second resin layers 23 and 24 may be a pencil hardness of F to B.

As illustrated in FIG. 6, the polymer film layer 22 and the first UV resin layer 23 may be formed to be smaller than the window part 21 and the bracket 25a formed in the display part 25.

That is, an avoidance space 30 for avoiding an impact F (see FIG. 7) transferred to a side of the electronic device if, for example, the electronic device (not illustrated) is dropped, or for preventing an external coupling structure from being impacted when the coupling structure is pushed in, is formed between the polymer film layer 22 and the bracket 25*a*.

In exemplary embodiments, a thickness of the avoidance space 30 may be from 0 to 0.3 mm, or more specifically, a thickness of the avoidance space 30 may be from only 0 mm to 0.25 mm.

In describing a process of manufacturing the touch panel 20 having improved visibility in more detail with reference to FIGS. 6 and 7, as illustrated in FIG. 6, the window part 21 is attached to the bonding layer 22*a* formed of an OCA (not illustrated) formed on an upper surface of the polymer film layer 22. The first UV resin layer 23 is attached by using the soft primer layer 22*c* formed on a bottom surface of the polymer film layer 22. The pattern 27 is formed in the first UV resin layer 23. The pattern may correspond to any of a pattern of a hair line, a lattice pattern, and the like. In this state, the second UV resin layer 24 is attached to a bottom surface of the first UV resin layer 23. The touch sensor film module 26 is attached to the second UV resin layer 24, and the bracket 25*a* of the display part 25 is attached to the pattern 27 by using a double-sided tape 28.

Referring to FIG. 7, the polymer film layer 22 and the first UV resin layer 23 are formed to be smaller than the window part 21 and the bracket 25*a* of the display part 25, and thus the polymer film layer 22 and the first UV resin layer 23 are formed between the window part 21 and the bracket 25*a* of the display part 25 are recessed by a predetermined depth to inner sides of the window part 21 and the bracket 25*a* of the display part 25 at the same time.

That is, the polymer film layer 22 and the first UV resin layer 23 are recessed and the avoidance space 30 is formed between the window part 21 and the bracket 25*a*, and an impact F (see FIG. 7) transferred to side surfaces of the polymer film layer 20 and the first UV resin layer 23 can be avoided by the avoidance space 30 when the touch panel 20 drops.

Referring to FIG. 7, when the touch panel 20 is dropped, the protruding window part 21 and bracket 25*a* are brought into contact so that an impact F is applied to the protruding window part 21 and bracket 25*a* and the mitigated impact F is transferred to the polymer film layer 22 and the first UV resin layer 23.

Further, if, for example, an external coupling structure (not illustrated) is pushed into the touch panel 20, the window part 21 and the bracket 25*a* first contact the external coupling structure so that an impact is applied to the window part 21 and the bracket 25*a* and the mitigated impact is transferred to the polymer film layer 22 and the first UV resin layer 23.

Thus, the polymer film layer 22 and the first UV resin layer 23 are first directly brought into contact when the touch panel 20 is dropped, and an external coupling structure is pushed in to prevent an impact F (see FIG. 7) from being transferred. Accordingly, the polymer film layer 22 and the first UV resin layer 23 can be protected.

Additionally, the primer layer (not illustrated) formed on an existing polymer film layer 3 (see FIG. 1) may be formed of a hard material, causing the UV resin layer 4 (see FIG. 1) to easily crack when an electronic device is dropped.

Thus, in order to address this disadvantage, in exemplary embodiments of the present invention, a soft primer layer may be formed in the polymer film layer 22 to improve a bonding force of the first UV resin layer 23 and to prevent the first UV resin layer 23 from cracking due to an impact F (see FIG. 7) generated if, for example, an electronic device is dropped.

Hereinafter, a method of manufacturing the touch panel having improved visibility according to the second embodiment of the present invention will be described in detail.

Figure 8:
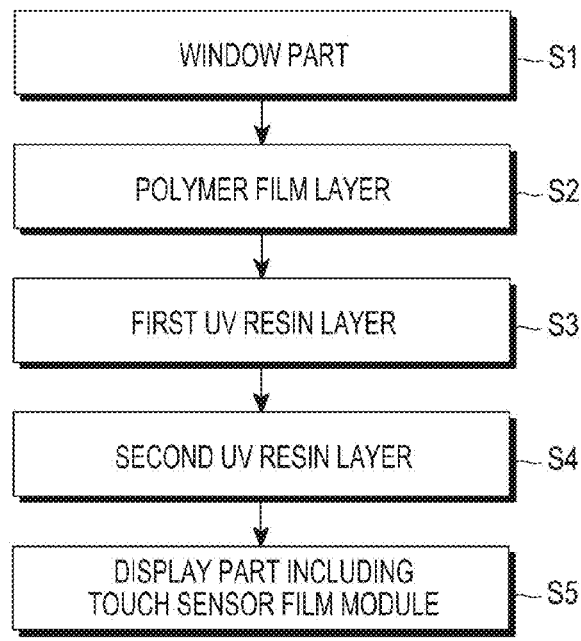
FIG. 8 is a flowchart illustrating a method of manufacturing a touch panel having improved visibility according to the second exemplary embodiment of the present invention.

FIG. 8 is a view illustrating the method of manufacturing a touch panel having improved visibility according to an exemplary embodiment of the present invention.

Referring to FIG. 8, the method of manufacturing the touch panel 20 having improved visibility will be described. In step S1, the window part 21 formed of tempered glass is manufactured.

In step S2, the polymer film layer 22 is attached to a bottom surface of the window part 21 manufactured in step S1 by using the bonding layer 22*a*.

In step S3, the first UV resin layer 23 is attached to a bottom surface of the polymer film layer 22 by using the soft primer layer 22*c* from step S2.

A pattern 27 such as a hair line, a lattice pattern, or the like may be formed in the first UV resin layer 23

In step S4, the second UV resin layer 24 for preventing refractions and reflections of light is attached to a bottom surface of the first UV resin layer 23 from step S3.

In step S5, the display part 25 including the touch sensor film module 26 is attached to a bottom surface of the second UV resin layer 24 from step S4.

The polymer film layer 22 and the first UV resin layer 23 are formed to be smaller than the window part 21 and the bracket 25*a* formed in the display part 25.

That is, an avoidance space 30 for avoiding an impact transferred to a side of the electronic device if, for example, the electronic device (not illustrated) is dropped, or for preventing an external coupling structure from being impacted when the coupling structure (not illustrated) is pushed in, is formed between the polymer film layer 22 and the bracket 25*a*.

In exemplary embodiments of the present invention, a thickness of the avoidance space 30 may be from 0 to 0.3 mm, or more specifically, a thickness of the avoidance space 30 may be from only 0 to 0.25 mm.

Figure 9A:
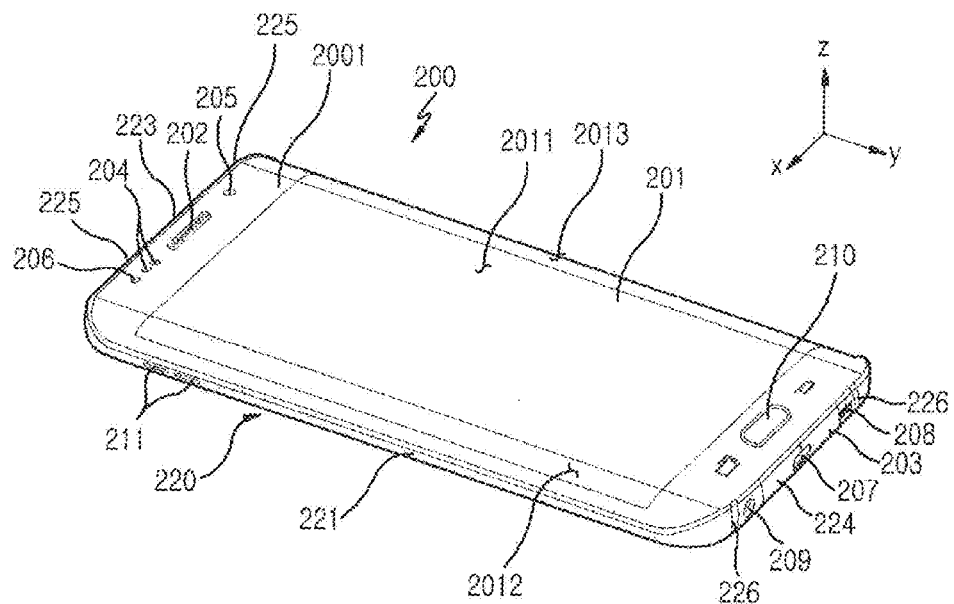
FIG. 9A is a front perspective view of an electronic device according to various embodiments of the present disclosure.
Figure 9B:
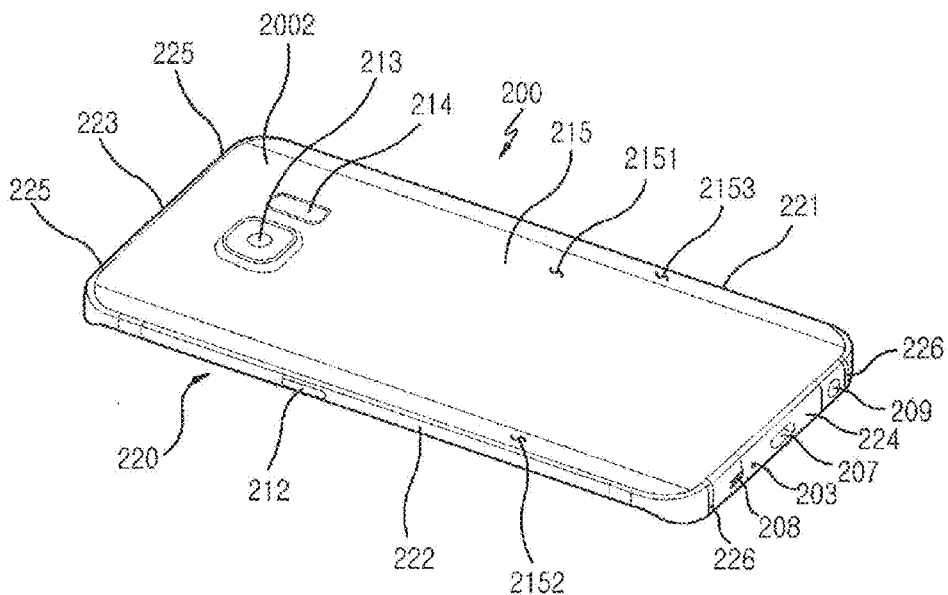
FIG. 9B is a rear perspective view of an electronic device according to various embodiments of the present disclosure.
Figure 9C:
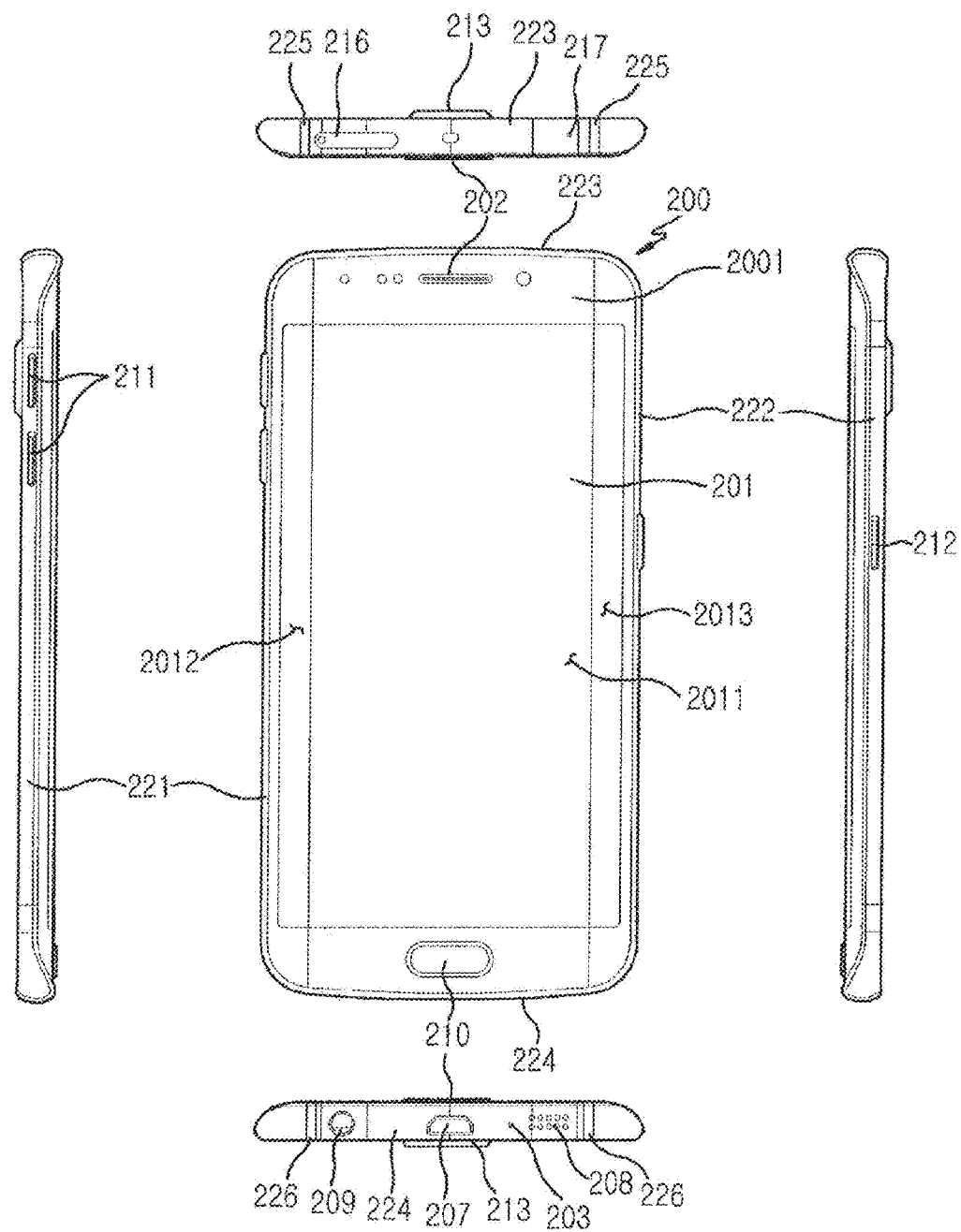
FIG. 9C is multiple views viewed from various sides of an electronic device according to various embodiments of the present disclosure.

FIG. 9A is a front perspective view of an electronic device 200 according to various embodiments of the present disclosure. FIG. 9B is a rear perspective view of an electronic device according to various embodiments of the present disclosure. FIG. 9C is multiple views viewed from various sides of an electronic device according to various embodiments of the present disclosure.

Referring to FIGS. 9A to 9C, a display 201 may be installed on a front surface 2001 of an electronic device 200. A receiver 202 for receiving a voice of a counterpart may be disposed on an upper side of the display 201. A microphone unit 203 for transmitting a voice of the user of the electronic device to a counterpart may be disposed on a lower side of the display 201.

According to an embodiment of the present disclosure, a component for performing various functions of the electronic device 200 may be disposed around the receiver 202. The component may include at least one sensor module 204. The sensor module 204 may include, for example, at least one of an illumination intensity sensor (for example, an optical sensor), a proximity sensor (for example, an optical sensor), an infrared ray sensor, and an ultrasonic sensor. According to an embodiment of the present disclosure, the components may include a front camera unit 205. According to an embodiment of the present disclosure, the components may include an indicator 206 for informing the user of state information of the electronic device 200.

According to various embodiments of the present disclosure, the electronic device 200 may include a metallic bezel 220 as a metallic housing. According to an embodiment of the present disclosure, the metallic bezel 220 may be disposed along a periphery of the electronic device 200, and may be expanded to at least an area of a rear surface of the electronic device 200 extending from the periphery to be disposed. According to an embodiment of the present disclosure, the metallic bezel 220 may define at least a portion of the thickness of the electronic device 200 along the periphery of the electronic device 200, and may have a closed loop shape. However, the present disclosure is not limited thereto, and the metallic bezel 220 may be formed in a manner that contributes to at least a portion of the thickness of the electronic device 200. According to an embodiment of the present disclosure, the metallic bezel 220 may be disposed only in at least an area of the periphery of the electronic device 200. According to an embodiment of the present disclosure, when the metallic bezel 220 contributes to a portion of the housing of the electronic device 200, the remaining portions of the housing may be replaced by a nonmetallic member. In this case, the housing may be formed in a manner in which a nonmetallic member is insert injection-molded in the metallic bezel 220. According to an embodiment of the present disclosure, the metallic bezel 220 may include one or more articulation parts 225 and 226, and the unit bezel part separated by the articulation parts 225 and 226 may be utilized as an antenna radiation body. According to an embodiment of the present disclosure, an upper bezel part 223 may contribute as a unit bezel part by a pair of articulation parts 225 formed at a predetermined interval. According to an embodiment of the present disclosure, a lower bezel part 224 may contribute as a unit bezel part by a pair of articulation parts 226 formed at a predetermined interval. According to an embodiment of the present disclosure, the articulation parts 225 and 226 may be formed together when the nonmetallic member is insert injection-molded in the metallic member.

According to various embodiments of the present disclosure, the metallic bezel 220 may have a closed loop shape along the periphery, and may be disposed in a manner that contributes to the entire thickness of the electronic device 200. According to an embodiment of the present disclosure, when the electronic device 200 is viewed from the front side, the metallic bezel 220 may include a left bezel part 221, a right bezel part 222, an upper bezel part 223, and a lower bezel part 224.

According to various embodiments of the present disclosure, various electronic components may be disposed in the lower bezel part 224 of the electronic device. According to an embodiment of the present disclosure, a speaker unit 208 may be disposed on one side of the microphone unit 203. According to an embodiment of the present disclosure, an interface connector port 207 for receiving a data transmitting/receiving function by an external device and external power to charge the electronic device 200 may be disposed on an opposite side of the microphone unit 203. According to an embodiment of the present disclosure, an ear jack hole 209 may be disposed on one side of the interface connector port 207. According to an embodiment of the present disclosure, all of the microphone unit 203, the speaker unit 208, the interface connector port 207, and the ear jack hole 209 may be disposed in an area of the unit bezel part formed by the pair of articulation parts 226 disposed in the lower bezel part 224. However, the present disclosure is not limited thereto, and at least one of the above-mentioned electronic components may be disposed in an area including the articulation part 226 or on an outside of the unit bezel part.

According to various embodiments of the present disclosure, various electronic components also may be disposed in the upper bezel part 223 of the electronic device 200. According to an embodiment of the present disclosure, a socket unit 216 for inserting a card type external device may be disposed in the upper bezel part 223. According to an embodiment of the present disclosure, the socket unit 216 may accommodate at least one of a private ID card for the electronic device (for example, a SIM card and a UIM card) and a memory card for expanding a storage space. According to an embodiment of the present disclosure, an infrared ray sensor module 213 may be disposed on one side of the socket unit 216, and an auxiliary microphone unit 217 may be disposed on one side of the infrared ray sensor module 213. According to an embodiment of the present disclosure, all of the socket unit 216, the infrared ray sensor module 213, and the auxiliary microphone unit 217 may be disposed in an area of the unit bezel part formed by the pair of articulation parts 225 disposed in the upper bezel part 223. However, the present disclosure is not limited thereto, but at least one of the above-mentioned electronic components may be disposed in an area including the articulation part 225 or on an outside of the articulation part.

According to various embodiments of the present disclosure, at least one first side key button 211 may be disposed in the left bezel part 221 of the metallic bezel 220. According an embodiment of the present disclosure, a pair of first side key buttons 211 may protrude from the left bezel part 221 to contribute to a volume up/down function and a scroll function. According to an embodiment of the present disclosure, at least one second side key button 212 may be disposed in the right bezel part 222 of the metallic bezel 220. According to an embodiment of the present disclosure, the second side key button 212 may contribute to a power on/off function and a wakeup/sleep function of the electronic device. According to an embodiment of the present disclosure, at least one key button 210 may be disposed in at least an area of a lower area of the front surface 2001 of the electronic device 200 other than the display. According to an embodiment of the present disclosure, the key button 210 may perform a home key button function. According to an embodiment of the present disclosure, a fingerprint recognition sensor unit may be disposed on an upper surface of the home key button. According to an embodiment of the present disclosure, the home key button may perform a first function (a home screen return function or a wakeup/sleep function) through a physical press operation, and may perform a second function (for example, a fingerprint recognition function) through a swiping of an upper surface of the home key button. Although not illustrated, touch pads are disposed on the left and right sides of the key button 210 to perform a touch function.

According to various embodiment of the present disclosure, a rear camera unit 213 may be disposed on a rear surface 2002 of the electronic device 200, and at least one electronic component 214 may be disposed on one side of the rear camera unit 213. According to an embodiment of the present disclosure, the electronic component 214 may include at least one of an illumination intensity sensor (for example, an optical sensor), a proximity sensor (for example, an optical sensor), an infrared ray sensor, an ultrasonic sensor, a heart rate sensor, and a flash unit.

According to various embodiments of the present disclosure, a front surface 2001 including the display 201 may include a planar part 2011, a left bending part 2012 and a right bending part 2013 formed on the left and right sides of the planar part 2011. According to an embodiment of the present disclosure, the front surface 2001 of the electronic device 200 may include all of a display area 201 and the other areas (for example, a BM area) using one window. According to an embodiment of the present disclosure, the left and right bending parts 2012 and 2013 may extend in the x-axis direction of the electronic device of FIG. 2A in the planar part 2011. According to an embodiment of the present disclosure, the left and right bending parts 2012 and 2013 may contribute as a part of the side surface of the electronic device 200. In this case, the left and right bending parts 2012 and 2013 and the left and right bezel parts 221 and 222 of the metallic bezel 220 may contribute as a side surface of the electronic device 200 together. However, the present disclosure is not limited thereto, and the front surface 2001 including the display 201 may include only at least one of the left and right bending parts 2012 and 2013. According to an embodiment of the present disclosure, the front surface 2001 may include only a left bending part 2012 along the planar part 2011, or may include only a right bending part 2013 along the planar part 2011.

According to various embodiments of the present disclosure, the front surface 2001 may include a window including the left and right bending parts 2012 and 2013 and a flexible display module applied to at least an area of a lower side of the window. According to an embodiment of the present disclosure, an area including the flexible display module may contribute as the display area 201. According to an embodiment of the present disclosure, the window may be formed in a method in which an upper surface and a rear surface of the window are bent at the same time (hereinafter, a 3-D method). However, the present disclosure is not limited thereto, but the left and right parts of the upper surface of the window may be curved and the rear surface of the window may be formed to be planar (hereinafter, a 2.5D method). According to an embodiment of the present disclosure, the window may be formed of a transparent glass material (for example, sapphire glass) or a transparent synthetic resin material.

According to various embodiments of the present disclosure, the electronic device 200 may control the display module to selectively display information. According to an embodiment of the present disclosure, the electronic device 200 may control the display module to provide a screen only in the planar part 2011. According to an embodiment of the present disclosure, the electronic device 200 may control the display module to provide a screen in any one of the left and right bending parts 2012 and 2013 together with the planar part 2011. According to an embodiment of the present disclosure, the electronic device 200 may control the display module to provide a screen in only one of the left and right bending parts 2012 and 2013 except for the planar part 2011.

According to various embodiment of the present disclosure, the rear surface 2002 of the electronic device 200 also may be formed by one window 215 as a whole. According to an embodiment of the present disclosure, a rear surface 2002 may include a planar part 2151 substantially formed at the center thereof, a left bending part 2152 and a right bending part 2153 formed on the left and right sides of the planar part 2151. According to an embodiment of the present disclosure, the window 215 may be configured in a 2.5D manner in which the left and right bending parts 2152 and 2153 of the outer surface of the window 215 are curved and a rear surface of the window 215 is formed to be planar. However, the present disclosure is not limited thereto, but the window may be formed in a 3D manner as in the window disposed in the front surface 2001. According to an embodiment of the present disclosure, the left and right bending parts 2152 and 2153 may contribute as a part of the side surface of the electronic device 200. In this case, the left and right bending parts 2152 and 2153 and the left and right bezel parts 221 and 222 of the metallic bezel 220 may contribute as a side surface of the electronic device 200 together. However, the present disclosure is not limited thereto, and the rear surface 2002 may include only at least one of the left and right bending parts 2152 and 2153. According to an embodiment of the present disclosure, the rear surface 2002 may include only a left bending part 2152 along the planar part 2151, or may include only a right bending part 2153 along the planar part 2151.

According to various embodiments of the present disclosure, upper left and right corner parts and lower left and right corner parts of the front surface 2001 may be simultaneously inclined in the x-axis direction, the y-axis direction, and the z-axis direction of FIG. 2A while the window is bent. Due to the shape, the heights of the side surfaces of the upper left and right corner parts and the lower left and right corner parts of the metallic bezel 220 may gradually decrease.

Figure 10:
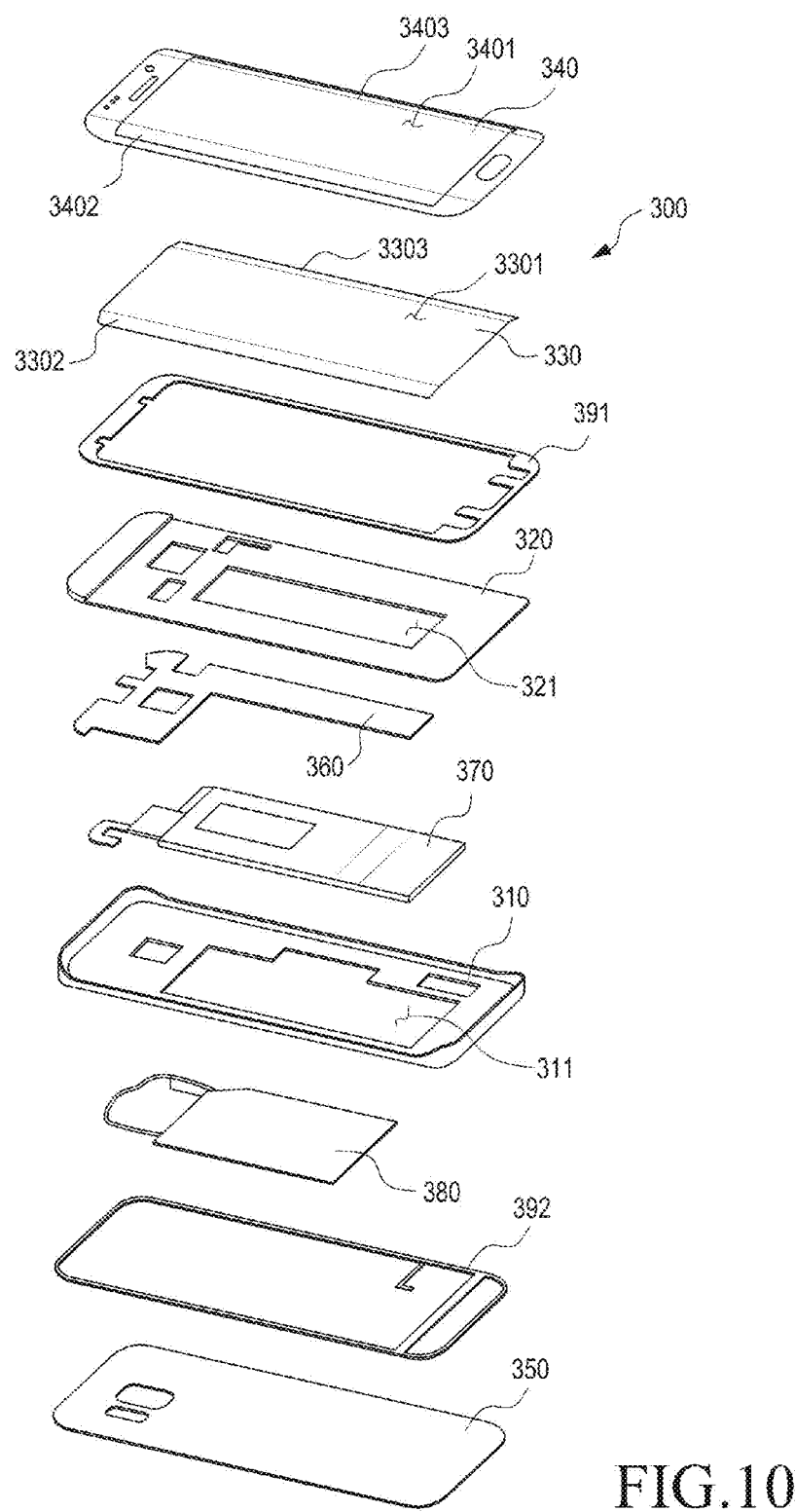
FIG. 10 is an exploded perspective view of an electronic device according to various embodiments of the present disclosure.

FIG. 10 is an exploded perspective view of an electronic device 300 according to various embodiments of the present disclosure. Hereinafter, the electronic device 300 of FIG. 10 and the above-mentioned electronic device 200 are the same electronic device.

Referring to FIG. 10, the electronic device 300 may be disposed such that a PCB 360, a bracket 320, a display module 330, and a front window 340 are sequentially stacked on an upper side of the housing 310. According to an embodiment of the present disclosure, a wireless power transmission/reception member 380 and a rear window 350 may be sequentially stacked on a lower side of the housing 310. According to an embodiment of the present disclosure, the battery pack 370 may be accommodated in an accommodation space 311 of the battery pack 370 formed in the housing 310, and may be disposed to avoid the PCB 360. According to an embodiment of the present disclosure, the battery pack 370 and the PCB 360 do not overlap each other but may be disposed in a parallel manner. According to an embodiment of the present disclosure, the display module 330 may be fixed to the bracket 320, and the front window 340 may be fixedly attached to the bracket 320 by a first bonding member 391. According to an embodiment of the present disclosure, the rear window 350 may be fixedly attached to the housing 310 by a second bonding member 392.

According to an embodiment of the present disclosure, the front window 340 may include a planar part 3401, and a left bending part 3402 and a right bending part 3403 bent from the planar part 3401 in opposite directions. According to an embodiment of the present disclosure, the front window 340 may be located on the electronic device 300 to form a front surface of the electronic device 300 and may display a screen displayed by the display module 330 using a transparent material and provide input/output windows for various sensors. According to an embodiment of the present disclosure, although it is illustrated that the left and right bending parts 3402 and 3403 have a shape formed in a 3D manner, an upper/lower single refraction form or an upper/lower/left/right double refraction form may be applied in addition to the left/right refraction form. According to an embodiment of the present disclosure, a touch panel may be further disposed on a rear surface of the front window 340, and a touch input signal may be received from the outside through the touch panel.

According to various embodiments of the present disclosure, the display module 330 also may have a shape (having a corresponding curvature) corresponding to the front window 340. According to an embodiment of the present disclosure, the display module 330 may include left and right bending parts 3302 and 3303 with respect to the planar part 3301. According to an embodiment of the present disclosure, the display module 330 may employ a flexible display (UB) module. According to an embodiment of the present disclosure, when the rear surface of the front window 340 has the form of a window of a planar manner (hereinafter, a 2D manner or a 2.5D manner), a general Liquid Crystal Display (LCD) or an On-Cell Tsp AMOLED (OCTA) may be applied because the rear surface of the front window 340 is planar.

According to various embodiments of the present disclosure, the first bonding member 391 is a component for fixing the front window 340 to the bracket 320 disposed in the electronic device 300, and may be a double-sided tape or a liquid adhesive layer such as bond. According to an embodiment of the present disclosure, when a double-sided tape is applied as the first bonding member 391, a general Poly-Ethylene Terephsthalate material may be applied or a functional base may be applied as an internal base. For example, the front window can be prevented from being damaged by an external impact by reinforcing an impact-resistant property using a base using a foam type or impact-resistant cloth.

According to various embodiments of the present disclosure, the bracket 320 may be disposed in the electronic device 300 and may be used as a component for reinforcing the entire strength of the electronic device 300. According to an embodiment of the present disclosure, the bracket 320 may be formed of at least one metal such as Al, Mg, and STS. According to an embodiment of the present disclosure, the bracket 320 may be formed of a high strength plastic containing glass fiber or may be formed of both a metal and a plastic. According to an embodiment of the present disclosure, when a metallic member and a nonmetallic member are used together, the bracket 320 may be formed in a manner in which a metallic member is insert injection-molded in a nonmetallic member. According to an embodiment of the present disclosure, the bracket 320 is located on a rear surface of the display module 330, and has a shape (curvature) similar to the shape of the rear surface of the display module 330 to support the display module 330. According to an embodiment of the present disclosure, a resilient member such as sponge or rubber, a bonding layer such as a double-sided tape or a sheet such as a tape may be further disposed between the bracket 320 and the display module 330 to protect the display module 330. According to an embodiment of the present disclosure, some sections of the bracket 320 may further include a spot facing and hole area 321 for securing a space for mounting a component or a marginal space in consideration of a change of a component during use thereof, such as swelling of the battery pack 370. According to an embodiment of the present disclosure, an auxiliary unit for reinforcing an internal strength by adding a metal or a complex material in the form of a plate in the corresponding hole area 321 may be included if necessary or for improving thermal characteristics or antenna characteristics. According to an embodiment of the present disclosure, the bracket 320 may be coupled to the housing (for example, a rear case) 310 to form a space therein, and at least one electronic component may be disposed in the space. The electronic component may include a Printed Circuit Board (PCB) 360. However, the present disclosure is not limited thereto, and may include an antenna unit, an acoustic unit, a power unit, and a sensor unit in addition to a PCB 360.

According to various embodiments of the present disclosure, the battery pack 370 may supply electric power to the electronic device 300. According to an embodiment of the present disclosure, one surface of the battery pack 370 is adjacent to the display module 330, and an opposite surface of the battery pack 370 is adjacent to the rear window 350 such that the battery pack 370 may cause deformation or damage of a counterpart object while swelling during a charging operation of the battery pack 370. In order to prevent the problem, a swelling gap is provided between the battery pack 370 and the counterpart object (for example, the display module 330 and the rear window 350) to project the counterpart object. According to an embodiment of the present disclosure, the battery pack 370 may be disposed integrally with the electronic device 300. However, the present disclosure is not limited thereto, but the battery pack 370 may be detachable when the rear window 350 is detached from the electronic device 300.

According to various embodiments of the present disclosure, the housing 310 forms an outside (for example, a side surface including a metallic bezel) of the electronic device 300 and may be coupled to the bracket 320 to form an internal space. According to an embodiment of the present disclosure, the front window 340 is disposed on the front surface of the housing 310 and the rear window 350 may be disposed on the rear surface of the housing 310. According to an embodiment of the present disclosure, a gap between the housing 310 and an internal structure formed by the rear window 350 may prevent damage of the rear window 350 from a secondary strike by the internal structure when an external impact such as a fall of the electronic device 300 occurs.

According to various embodiments of the present disclosure, the wireless power transmission/reception member 380 may be disposed on the rear surface of the housing 310. According to an embodiment of the present disclosure, the wireless power transmission/reception member 380 may be disposed in an area of one surface of the internal embedded component or an inner surface of the housing 310 in the form of a thin film, in particular, in an area adjacent to the rear window 350, and includes a structure forming a contact point with an internal PCB 360. According to an embodiment of the present disclosure, the wireless power transmission/reception member 380 may be embedded or attached as a component of the battery pack 370 or a part of the housing 310, or may be attached to the component and the housing 310.

According to various embodiments of the present disclosure, the second bonding member 392 is a component for fixing the rear window 350 to the housing 310, and may be applied in the form similar to the first bonding member 391.

According to various embodiments of the present disclosure, the rear window 350 may be applied in the form similar to the front window 340. According to an embodiment of the present disclosure, a front surface of the rear window 350 (a surface exposed to the outside) may have a curvature to be inclined towards left and right ends. The rear surface of the rear window 350 according to an embodiment of the present disclosure is planar to be attached to the housing 310 by the second bonding member 392.

Figure 11:
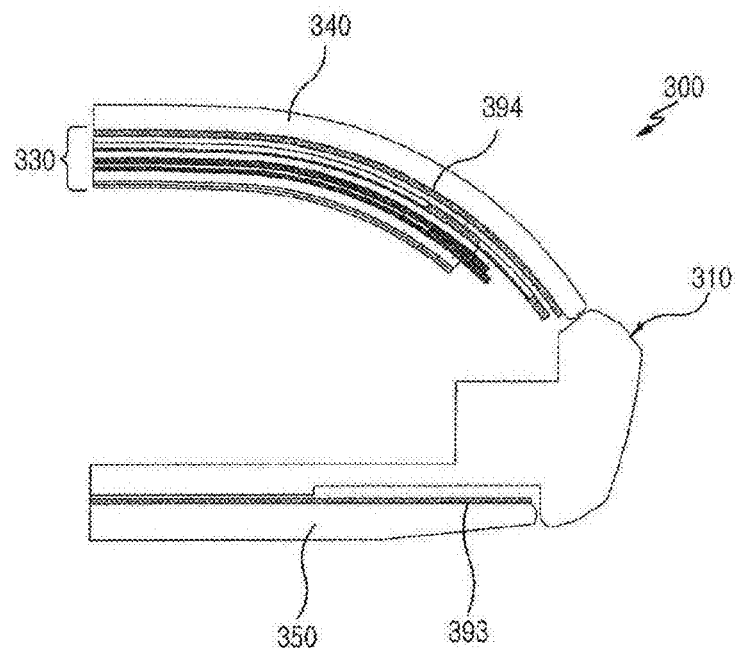
FIG. 11 is a partially sectional view illustrating a coupled state of an electronic device including an opaque layer according to various embodiments of the present disclosure.

FIG. 11 is a partially sectional view illustrating a coupled state of an electronic device 300 including an opaque layer 393 and 394 according to various embodiments of the present disclosure.

Referring to FIG. 11, according to an embodiment of the present disclosure, opaque layers 393 and 394 may be disposed between the rear surface of the front window 340 and the display module 330 or between the housing 310 and the rear surface of the rear window 350 to hide an interior of the electronic device. According to an embodiment of the present disclosure, the opaque layer 394 disposed on the front window 340 may be applied to an area (for example, a BM area) other than the display area. According to an embodiment of the present disclosure, the opaque layers 393 and 394 may be realized through a process such as printing, deposition, or painting, and a subsidiary member such as a film type sheet may be additionally attached. According to an embodiment of the present disclosure, the sheet may have various forms of patterns on one surface thereof through a process such as UV molding, printing, or painting. According to an embodiment of the present disclosure, the sheet may be applied to the front window 340 in addition to the rear window 350. According to an embodiment of the present disclosure, light transmittance can be lowered by directly coloring glass of the window or an aesthetic feeling can be improved by applying various colors. According to an embodiment of the present disclosure, at least one electronic component may be further disposed on the rear surface of the rear window 350. According to an embodiment of the present disclosure, the electronic component may include an input unit such as a touch panel, and a charging unit such as a wireless charging module, a communication module such as a Near Field Communication (NFC) antenna or a display module may be further disposed.

According to another embodiment of the present disclosure, the exterior member for the electronic device may include a window part 11 including a polymer film layer 12, and a first UV cured resin layer. The polymer film layer 12 may be attached to a lower portion of the window part 110 using an Optical Clean Adhesive (OCA) (not illustrated). The first UV cured resin layer 13 may be formed under the polymer film layer 120, and a pattern 13a may be formed in the first UV cured resin layer 13. The pattern 13a may be a decoration pattern, and the decoration pattern is a repeated design pattern including a fine hair line. A deposition layer 17 and a printing layer 18 may be further included in the pattern 13a to realize a color and a metallic feeling.

The pattern 13 may include any one of a decoration pattern, a three-dimensional pattern having a hair line, a molding pattern, and a lattice pattern. Here, the pattern 13 may be patterns other than the disclosed pattern (for example, a repeated pattern).

According to an embodiment of the present disclosure, the pattern 13a may include any one of a decoration pattern, a three-dimensional pattern having a hair line, a molding pattern, and a lattice pattern. Here, the pattern 13a may be patterns other than the disclosed pattern (for example, a repeated pattern).

Figure 12:
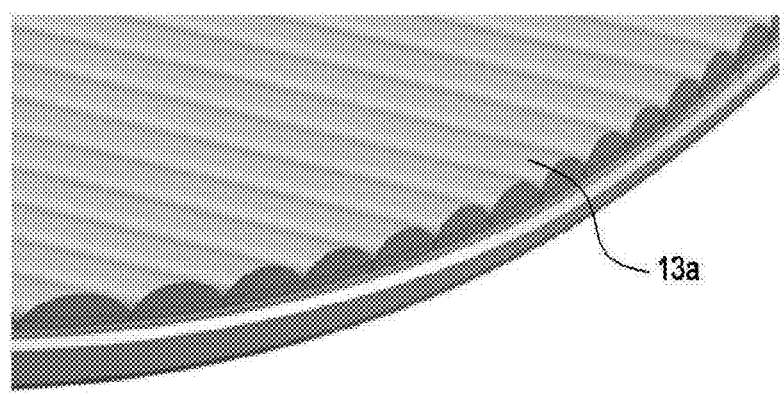
FIG. 12 illustrates a lenticular pattern according to various embodiments of the present disclosure.

According to an embodiment of the present disclosure, FIG. 12 illustrates that the pattern 13a is realized by a lenticular pattern. The pattern may be applied to at least one of the front surface and the rear surface of the exterior member of the electronic device. The lenticular pattern may be applied in a protruding shape in the form of a plurality of repeated stripes, and the direction of the stripes may be a widthwise direction, a lengthwise direction, or other possible directions of the electronic device. The protruding direction of the protruding shape of the stripes may be the direction towards the interior of the electronic device from the exterior member.

Figure 13A:
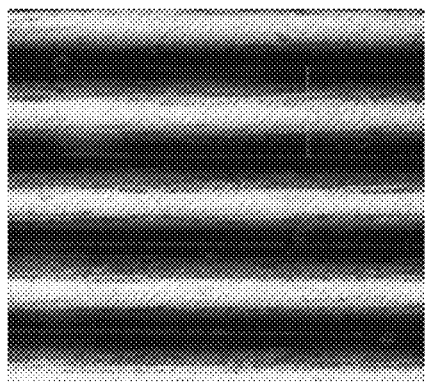
FIG. 13A is an enlarged view illustrating a lenticular pattern shape according to various embodiments of the present disclosure.

According to an embodiment of the present disclosure, FIG. 13A illustrates an enlarged view of the lenticular pattern shape. The height of the pattern is about 15 μm, but may be more than or less than 15 μm. The interval of the pattern is about 75 μm, but may be more than or less than 75 μm. It is advantageous in manufacturing that the height of the lenticular pattern increases and an interval of the lenticular pattern increases.

Figure 13B:
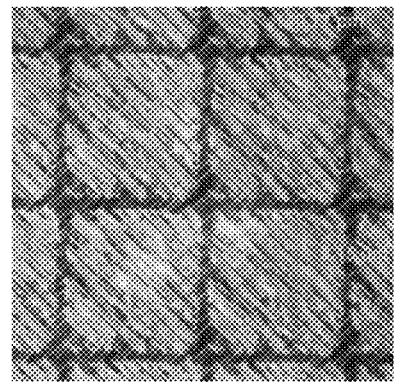
FIG. 13B is an enlarged view illustrating a lattice pattern shape according to various embodiments of the present disclosure.

According to an embodiment of the present disclosure, FIG. 13B illustrates an enlarged view of the lattice pattern shape. The height of the lattice pattern is about 10 μm, but may be more than or less than 10 μm. The width of the lattice pattern is about 140 μm, but may be more than or less than 140 μm.

Figure 14:
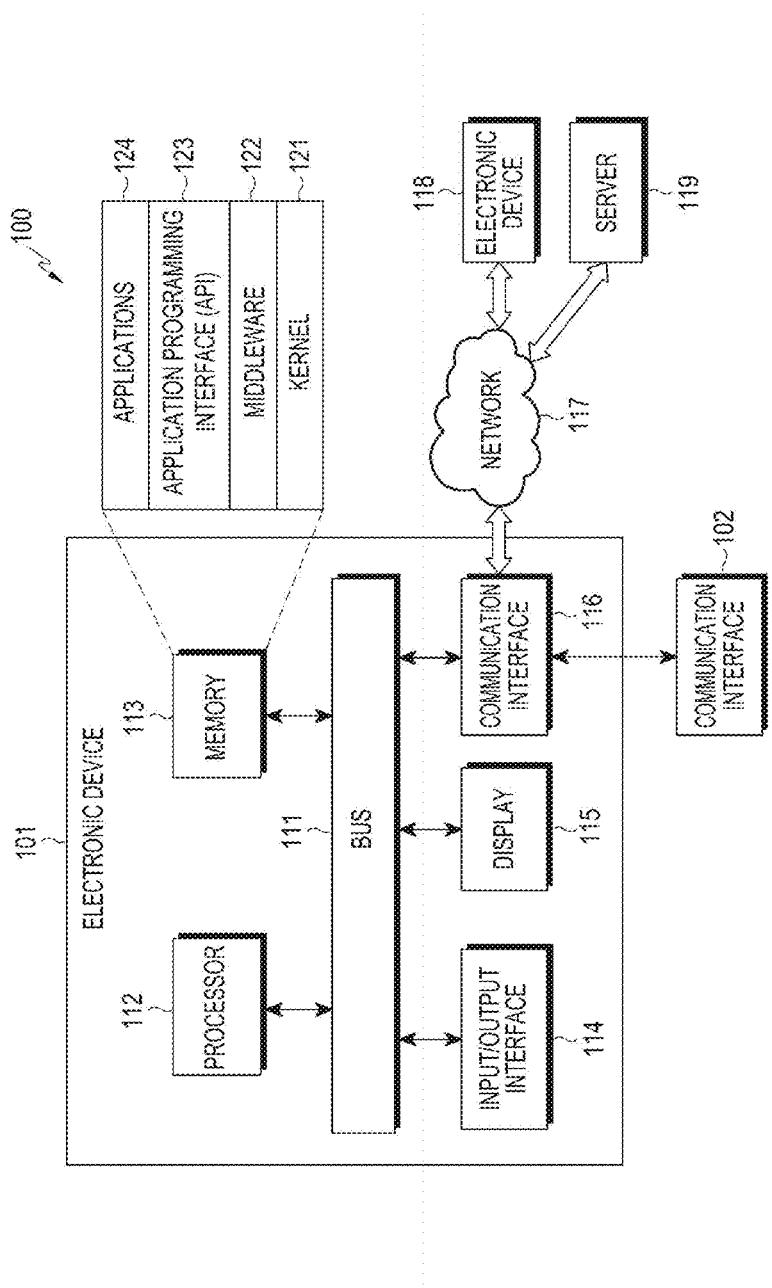
FIG. 14 illustrates a network environment including an electronic device according to an embodiment of the present disclosure.

FIG. 14 illustrates a network environment including an electronic device according to an embodiment of the present disclosure.

Referring to FIG. 14, an electronic device 101 may include a bus 111, a processor 112, a memory 113, an Input/Output (I/O) interface 114, a display 115, and a communication interface 116.

The bus 111 may be circuitry that connect the foregoing components and allow communication (e.g., send control messages) between the foregoing components.

The processor 112 may, for example, receive instructions from other components (e.g., the memory 113, the I/O interface 114, the display 115, or the communication interface 116), interpret the received instructions and execute computation or data processing according to the interpreted instructions.

The memory 113 may, for example, store instructions or data that are received from, or generated by, other components (e.g., the memory 113, the I/O interface 114, the display 115, or the communication interface 116). For example, the memory 113 may include programming modules such as a kernel 121, a middleware 122, an Application Programming Interface (API) 123 or an application 124. Each of the foregoing programming modules may include a combination of at least two of software, firmware or hardware.

The kernel 121 may control or manage system resources (e.g., the bus 111, the processor 112 or the memory 113) that may be used in executing operations or functions implemented in other programming modules such as, for example, the middleware 122, the API 123 or the application 124. Also, the kernel 121 may provide an interface for allowing the middleware 122, the API 123 or the application 124 to access individual components of the electronic device 101.

The middleware 122 may be a medium through which the kernel 121 may communicate with the API 123 or the application 124 to send and receive data. Also, the middleware 122 may control (e.g., scheduling or load balancing) work requests by one or more applications 124 by, for example, assigning priorities for using system resources (the bus 111, the processor 112 or the memory 113) of the electronic device 101 to the one or more applications 124.

The API 123 is an interface that may control functions that the application 124 may provide at the kernel 121 or the middleware 122. For example, the API 123 may include at least an interface or function (e.g., command) for file control, window control, video processing or character control.

According to various embodiments, the application 124 may include, for example, an SMS/MMS application, an email application, a calendar application, an alarm application, a health care application (e.g., exercise amount or blood sugar level measuring application) or an environmental information application (e.g., an application that may provide atmospheric pressure, humidity or temperature information). In addition to or alternatively, the application 124 may be an application that is associated with information exchange between the electronic device 101 and a peer electronic device (e.g., the electronic device 118). The application that is associated with the information exchange may include, for example, a notification relay application that may provide the peer electronic device with certain type of information, or a device management application that may manage the peer electronic device.

For example, the notification relay application may include a functionality that provides notification generated by other applications at the electronic device 101 (e.g., SMS/MMS application, email application, health care application or environmental information application) to a peer electronic device (e.g., the electronic device 118). In addition to or alternatively, the notification relay application may provide, for example, receive notification from a peer electronic device (e.g., the electronic device 118) and provide the notification to a user. The device management application may manage, for example, enabling or disabling of functions associated with at least a portion of a peer electronic device (the peer electronic device itself, or one or more components of the peer electronic device) in communication with the electronic device 101, controlling of brightness (or resolution) of a display of the peer electronic device, or application operated at, or service (e.g., voice call service or messaging service) provided by, the peer electronic device.

According to various embodiments, the application 124 may include, for example, one or more applications that are determined according to a property (e.g., type of electronic device) of the peer electronic device (e.g., the electronic device 118). For example, if the peer electronic device is an mp3 player, the application 124 may include one or more applications related to music playback. In another example, if the peer electronic device is a mobile medical device, the application 124 may be health care-related applications. According to an embodiment, the application 124 may include at least one of an application that is preloaded at the electronic device 101 or an application that is received from a peer electronic device (e.g., the electronic device 118 or the server 119).

The I/O interface 114, for example, may receive an instruction or data from a user and send, via the bus 111, the instruction or data to the processor 112, the memory 113, or the communication interface 116. For example, the I/O interface 114 may provide data associated with user input received via a touch screen to the processor 112. Also, the I/O interface 114 may, for example, output instructions or data received via the bus 111 from the processor 112, the memory 113, or the communication interface 116, via an I/O device (e.g., a speaker or a display). For example, the I/O interface 114 may output voice data processed using the processor 112, via a speaker.

The display 115 may display various types of information (e.g., multimedia or text data) to the user.

The communication interface 116 may provide communication between the electronic device 101 and one or more peer electronic devices (e.g., the electronic device 118 or the server 119). For example, the communication interface 116 may communicate with the peer electronic device by establishing a connection with the network 117 using wireless or wired communication. The wireless communication may be at least one of, for example, Wi-Fi, Bluetooth, Near Field Communication (NFC), Global Positioning System (GPS), or cellular communication (e.g., LTE, LTE-A, CDMA, WDCMA, UMTS, WiBro or GSM). The wired communication may be at least one of, for example, Universal Serial Bus (USB), High Definition Multimedia Interface (HDMI), recommended standard 232 (RS-232) or Plain Old Telephone Service (POTS).

According to various embodiments, the network 117 may be a telecommunications network. The telecommunications network may include at least one of, for example, a computer network, the Internet, the Internet of Things or a telephone network. According to an embodiment, a protocol (e.g., transport layer protocol, data link layer protocol or physical layer protocol) for communicating between the electronic device 101 and a peer electronic device may be supported by, for example, at least one of the application 124, the application programming interface 123, the middleware 122, the kernel 121 or the communication interface 116.

Figure 15:
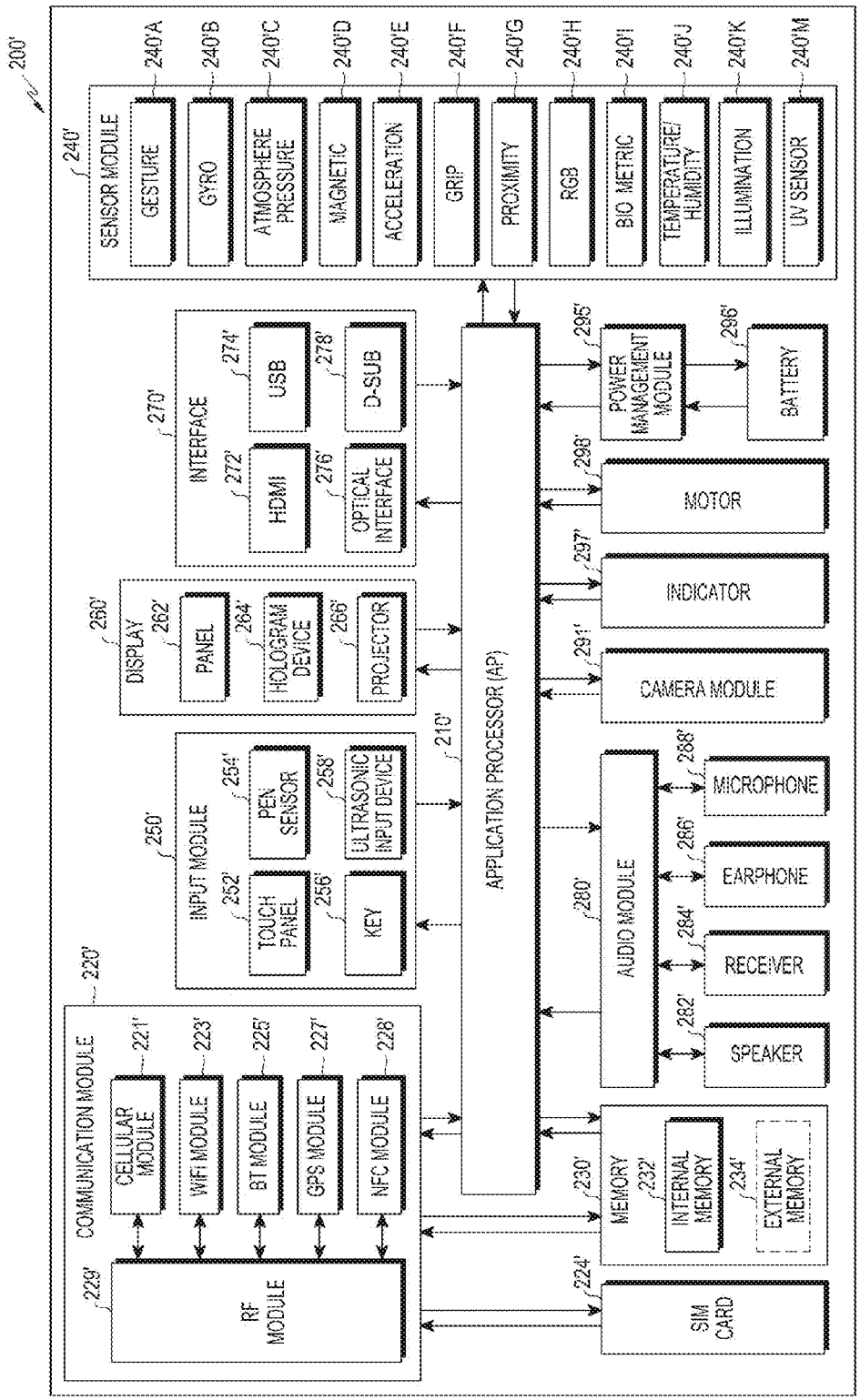
FIG. 15 illustrates a block diagram of an electronic device according to an embodiment of the present disclosure.

FIG. 15 illustrates a block diagram of an electronic device according to an embodiment of the present disclosure.

Referring to FIG. 15, an electronic device 200' may be, for example, a part or all of the electronic device 101. Referring to FIG. 15, the electronic device 200' may include one or more Application Processors (AP) 210', a communication module 220', a Subscriber Identification Module (SIM) card 224', a memory 230', a sensor module 240', an input module 250', a display module 260', an interface 270', an audio module 280'', a camera module 291', a power management module 295', a battery 296', an indicator 297' or a motor 298'.

The AP 210' may control one or more hardware or software components that are connected to the AP 210', or perform processing or computation of data (including multimedia data). The AP 210' may be implemented, for example, as a System-on-Chip (SoC). The AP 210' may further include a Graphics Processing Unit (GPU; not shown).

The communication module 220' (e.g., the communication interface 116) may transmit and receive data in communications between the electronic device 200' and other electronic devices (e.g., the electronic device 118 or the server 119). The communication module 220' may include, for example, one or more of a cellular module 221', a Wi-Fi module 222', a Bluetooth module 225', a GPS module 227', a Near-Field Communication (NFC) module 228', or a Radio Frequency (RF) module 229'.

The cellular module 221' may provide services such as, for example, voice call, video call, Short Messaging Service (SMS) or internet, via a communication network (e.g., LTE, LTE-A, CDMA, WCDMA, UMTS, WiBro or GSM). The cellular module 221' may, for example, also differentiate and authorize electronic devices within a communication network, using a subscriber identification module (SIM) card (e.g., the SIM card 224'). According to an embodiment, the cellular module 221' may perform at least a part of the functionalities of the AP 210'. For example, the cellular module 221' may perform at least a part of multimedia control functionality.

According to an embodiment, the cellular module 221' may include a Communication Processor (CP). The cellular module 221' may, for example, be implemented as SoC. Although FIG. 15 shows components such as the cellular module 221' (e.g., CP), the memory 230' or the power management module 295' as components that are separate from the AP 210', according to the present disclosure, the AP 210' may include, or be integrated with, one or more of the foregoing components (e.g., the cellular module 221').

According to an embodiment, the AP 210' or the cellular module 221' (e.g., a CP) may process instructions or data received from at least one of a non-volatile memory or other components by loading in a volatile memory. Also, the AP 210' or the cellular module 221' may store at the non-volatile memory at least one of data that is received from at least one of other components or data that is generated by at least one of the other components.

Each of the Wi-Fi module 222', the Bluetooth module 225', the GPS module 227' or the NFC module 228' may, for example, include one or more processors that may process data received or transmitted by the respective modules. Although FIG. 2 shows the cellular module 221', the Wi-Fi module 223', the Bluetooth module 225', the GPS module 227' and the NFC module 228' as separate blocks, according to an embodiment, any combination (e.g., two or more) of the cellular module 221', the Wi-Fi module 223', the Bluetooth module 225', the GPS module 227' or the NFC module 228' may be included in an Integrated Chip (IC) or an IC package. For example, at least some of the processors corresponding to the respective cellular module 221', the Wi-Fi module 223', the Bluetooth module 225', the GPS module 227' or the NFC module 228' may be implemented as a single SoC. For example, a CP corresponding to the cellular module 221' and a Wi-Fi processor corresponding to the Wi-Fi module 223' may be implemented as a single SoC.

The RF module 229' may, for example, transmit and receive RF signals. Although not shown, the RF module 229' may include a transceiver, a Power Amp Module (PAM), a frequency filter or a Low Noise Amplifier (LNA). Also, the RF module 229' may include one or more components for transmitting and receiving Electro-Magnetic (EM) waves in free space such as, for example, conductors or conductive wires. Although FIG. 15 shows that the cellular module 221', the Wi-Fi module 223', the Bluetooth module 225', the GPS module 227' and the NFC module 228' are sharing one RF module 229', according to an embodiment, at least one of the cellular module 221', the Wi-Fi module 223', the Bluetooth module 225', the GPS module 227' or the NFC module 228' may transmit and receive RF signals via a separate RF module.

The SIM card 224' may be a card implementing a SIM, and may be configured to be inserted into a slot disposed at a specified location of the electronic device. The SIM card 224' may include a unique identifier (e.g., Integrated Circuit Card Identifier (ICCID)) or subscriber information (e.g., International Mobile Subscriber Identity (IMSI)).

The memory 230' may include an internal memory 232' or a peer memory 224'. The internal memory 232' may be, for example, at least one of volatile memory (e.g., Dynamic RAM (DRAM), Static RAM (SRAM) or Synchronous Dynamic RAM (SDRAM)) or non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory or NOR flash memory).

According to an embodiment, the internal memory 232' may be a Solid State Drive (SSD). The peer memory 234' may be, for example, a flash drive (e.g., a Compact Flash (CF) drive, a Secure Digital (SD), a micro Secure Digital (micro-SD), a mini Secure Digital (mini-SD), an extreme Digital (xD) or a Memory Stick). The peer memory 234' may be operatively coupled to the electronic device 200' via various interfaces. According to an embodiment, the electronic device 200' may include recording devices (or recording media) such as, for example, Hard Disk Drives (HDD).

The sensor module 240' may measure physical/environmental properties or detect operational states associated with the electronic device 200', and convert the measured or detected information into signals such as, for example, electric signals or electromagnetic signals. The sensor module 240' may include at least one of, for example, a gesture sensor 240'A, a gyro sensor 240'B, an atmospheric pressure sensor 240'C, a magnetic sensor 240'D, an accelerometer 240'E, a grip sensor 240'F, a proximity sensor 240'G, an RGB sensor 240'H, a biometric sensor 240'I, a temperature/humidity sensor 240'J, a luminosity sensor 240'K or an Ultra Violet (UV) sensor 240'M. The sensor module 240' may detect the operation state of the electronic device or measure physical properties and convert the detected or measured information into electrical signals. Additionally or alternatively, the sensor module 240' may also include, for example, electrical-nose sensor (not shown), electromyography (EMG) sensor (not shown), electroencephalogram (EEG) sensor (not shown), infrared (IR) sensor (not shown), eye-scanning sensor (e.g., iris sensor; not shown) or fingerprint sensor. Sensor module 240' may also include control circuitry for controlling one or more sensors included therein.

The input module 250' may include a touch panel 252', a (digital) pen sensor 254', a key 256' or an ultrasonic input device 258'. The touch panel 252' may detect touch input using, for example, capacitive, resistive, infrared or ultrasonic methods. The touch panel 252' may also include a touch panel controller (not shown). A capacitive-type touch panel may, for example, detect proximity inputs (e.g. hovering input) in addition to, or alternative to, physical touch inputs. The touch panel 252' may also include a tactile layer. Haptic feedback may be provided to the user using the tactile layer.

The (digital) pen sensor 254' may be implemented, for example, using methods identical to or similar to receiving a touch input from a user, or using a separate detection sheet (e.g., a digitizer). The key 256' may be, for example, a keypad or a touch key. The ultrasonic input device 258' may be a device configured to identify data by detecting, using a microphone (e.g., the microphone 288'), ultrasonic signals generated by a device capable of generating the ultrasonic signal. The ultrasonic input device 258' may detect data wirelessly. According to an embodiment, the electronic device 200' may receive user input from a peer device (e.g., a network, computer or server) connected to electronic device 200' using the communication module 220'.

The display module 260' (e.g., the display 115) may include a panel 262', a hologram device 264' or a projector 266'. The panel 262' may be, for example, a Liquid-Crystal Display (LCD) or an Active-Matrix Organic Light-Emitting Diode (AM-OLED) display. The panel 262' may be configured to be, for example, flexible, transparent or wearable. The panel 262' and the touch panel 252' may be implemented as a single module. The hologram device 264' may utilize the interference of light waves to provide a three-dimensional image in empty space. The projector 266' may provide image by projecting light on a surface (e.g., a wall or a screen). The surface may, for example, be positioned internal or peer to the electronic device 200'. According to an embodiment, the display module 260' may also include a control circuitry for controlling the panel 262', the hologram device 264' or the projector 266'.

The interface 270' may include, for example, one or more interfaces for a High-Definition Multimedia Interface (HDMI) 272', a Universal Serial Bus (USB) 274', a projector 276 or a D-subminiature (D-sub) 278'. Additionally or alternatively, the interface 270' may include, for example, one or more interfaces for Secure Digital (SD)/MultiMedia Card (MMC) (not shown) or Infrared Data Association (IrDA) (not shown).

The audio codec 280" may encode/decode a voice into an electrical signal, and vice versa. The audio codec 280" may, for example, encode/decode voice information that is input into, or output from, the speaker 282', the receiver 284', the earphone 286' or the microphone 288'.

The camera module 291' may capture still images or video. According to an embodiment, the camera module 291' may include one or more image sensors (e.g., front sensor module or rear sensor module; not shown), an Image Signal Processor (ISP, not shown), or a flash Light-Emitting Diode (flash LED, not shown).

The power management module 295' may manage electrical power of the electronic device 200'. Although not shown, the power management module 295' may include, for example, a Power Management Integrated Circuit (PMIC), a charger Integrated Circuit (charger IC) or a battery fuel gauge.

The PMIC, for example, may be disposed in an integrated circuit or an SoC semiconductor. The charging method for the electronic device 200' may include wired or wireless charging. The charger IC may charge a battery, or prevent excessive voltage or excessive current from a charger from entering the electronic device 200'. According to an embodiment, the charger IC may include at least one of a wired charger IC or a wireless charger IC. The wireless charger IC may be, for example, a magnetic resonance type, a magnetic induction type or an electromagnetic wave type, and may include circuits such as, for example, a coil loop, a resonance circuit or a rectifier.

The battery gauge may measure, for example, charge level, voltage while charging, or temperature of the battery 296'. The battery 296' may supply power to, for example, the electronic device 200'. The battery 296' may be, for example, a rechargeable battery.

The indicator 297' may indicate one or more states (e.g., boot status, message status or charge status) of the electronic device 200' or a portion thereof (e.g., the AP 210'). The motor 298' may convert electrical signal into mechanical vibration. The MCU 299' may control the sensor module 240'.

Although not shown, the electronic device 200' may include one or more devices for supporting mobile television (mobile TV, e.g., a Graphics Processing Unit (GPU)). The devices for supporting mobile TV support processing of media data compliant with, for example, Digital Multimedia Broadcasting (DMB), Digital Video Broadcasting (DVB) or media flow.

Figure 16:
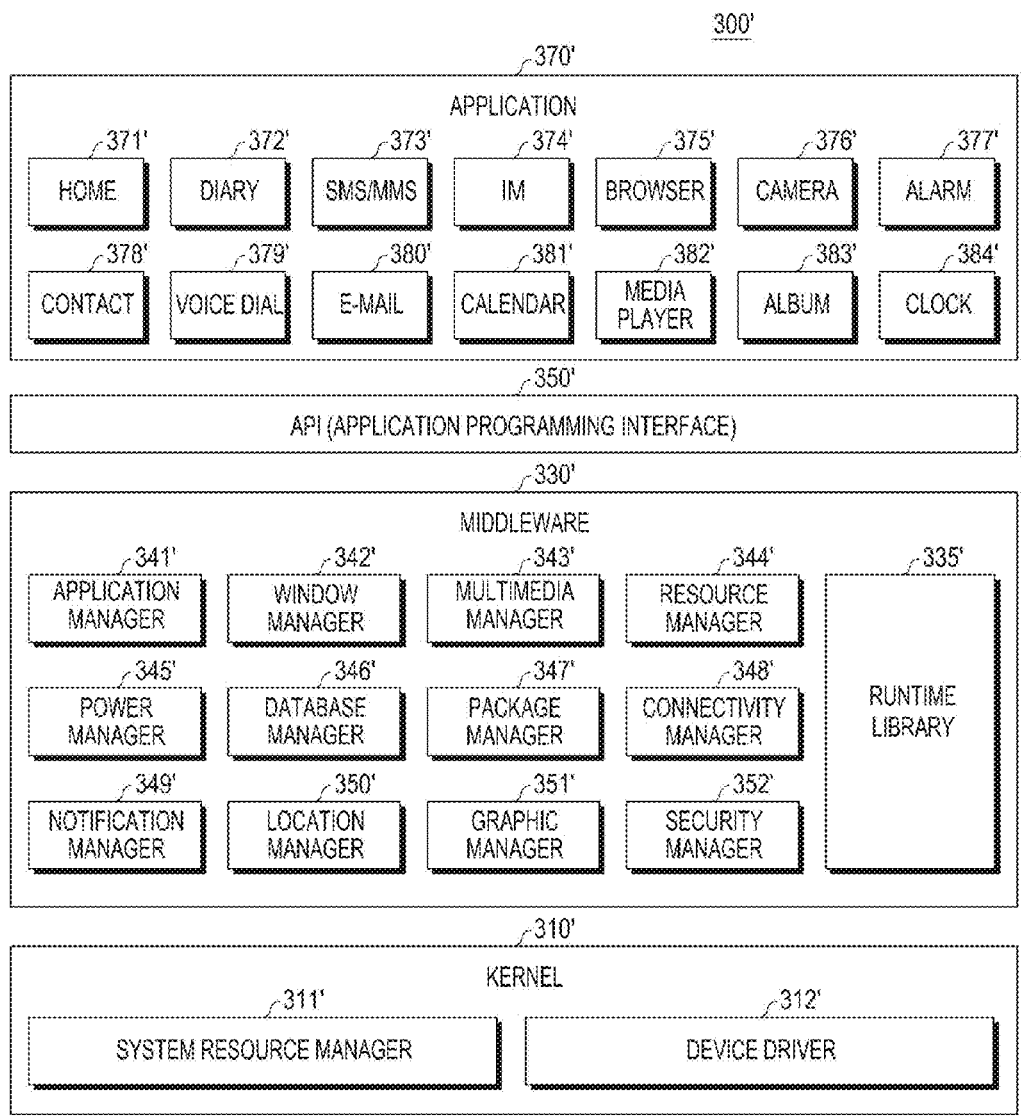
FIG. 16 illustrates a block diagram of a programming module according to an embodiment of the present disclosure.

FIG. 16 illustrates a block diagram of a programming module according to an embodiment of the present disclosure.

Referring to FIG. 16, a programming module 300' may be included (for example, stored) in the electronic device 100 (for example, in the memory 113) illustrated in FIG. 14. At least a part of the programming module 300' may be implemented in software, firmware, hardware, or in a combination of them. The programming module 300' may be implemented in hardware (for example, the electronic device 200') and may include an Operating System (OS) that controls resources related to an electronic device (for example, the electronic device 100) or various applications executed on the OS (for example, applications 370'). For example, the OS may be Android, iOS, Windows, Symbian, Tizen, Bada, or the like. Referring to FIG. 16, the programming module 300' may include a kernel 310', middleware 330', an Application Programming Interface (API) 360', or the applications 370'.

The kernel 310' (for example, the kernel 121) may include a system resource manager 311' or a device driver 312'. The system resource manager 311' may include, for example, a process manager (not shown), a memory manager (not shown), or a file system manager (not shown). The system resource manager 311' may control, allocate, or deallocate system resources. The device driver 312' may include, for example, a display driver (not shown), a camera driver (not shown), a Bluetooth driver (not shown), a shared memory driver (not shown), a USB driver (not shown), a keypad driver (not shown), a Wi-Fi driver (not shown), or an audio driver (not shown). In an embodiment of the present disclosure, the device driver 312' may include an Inter-Process Communication (IPC) driver (not shown).

The middleware 330' may include a plurality of modules that have already been implemented to provide functions commonly used for the applications 370'. The middleware 330' may provide functions through the API 360' so that the applications 370' may efficiently use limited system resources available within the electronic device. For example, as illustrated in FIG. 16, the middleware 330' (for example, the middleware 122) may include at least one of a runtime library 335', an application manager 341', a window manager 342', a multimedia manager 343', a resource manager 344', a power manager 345', a database manager 346', a package manager 347', a connectivity manager 348', a notification manager 349', a location manager 350', a graphic manager 351', or a security manager 352'.

The runtime library 335' may include, for example, a library module that a complier uses to add a new function in a programming language during execution of an application 370'. In an embodiment of the present disclosure, the runtime library 335' may perform input/output, memory management, a function related to arithmetic function, or the like.

The application manager 341' may manage, for example, the life cycle of at least one of the applications 370'. The window manager 342' may manage GUI resources used for a screen. The multimedia manager 343' may determine formats used to play back various media files and may encode or decode a media file using a CODEC suitable for the format of the media file. The resource manager 344' may manage resources including source code, a memory, or storage space of at least one of the applications 370'.

The power manager 345' may manage a battery or a power source by operating in conjunction with a Basic Input/Output System (BIOS) and may provide power information used for an operation. The database manager 346' may manage a database for at least one of the applications 370' so that the database may be generated, searched, or modified. The package manager 347' may manage installation or update of an application distributed as a package file.

The connectivity manager 348' may manage, for example, wireless connectivity of Wi-Fi, Bluetooth, or the like. The notification manager 349' may indicate or notify an event such as message arrival, a schedule, a proximity alarm, or the like in a manner that does not bother a user. The location manager 350' may mange position information about the electronic device. The graphic manager 351' may manage graphical effects to be provided to the user or related user interfaces. The security manager 352' may provide an overall security function used for system security, user authentication, and the like. In an embodiment of the present disclosure, if the electronic device (for example, the electronic device 100) has a telephony function, the middleware 330' may further include a telephony manager (not shown) to manage a voice or video call function of the electronic device.

A new middleware module may be created and used by combining various functions of the above-described component modules in the middleware 330'. The middleware 330' may provide a customized module for each OS type in order to provide differentiated functions. In addition, the middleware 330' may dynamically delete a part of the existing components or add a new component. Accordingly, a part of the components may be omitted, another component may be added, or a component may be replaced with a component with a different name but a similar function in the embodiment of the present disclosure.

The API 360' (for example, the API 123) is a set of API programming functions, which may be configured differently according to an OS. For example, in the case of Android or iOS, one API set may be provided per platform, whereas in the case of Tizen, two or more API sets may be provided per platform.

The applications 370' (for example, the applications 124) may include, for example, a preloaded application or a third party application.

At least a part of the programming module 300' may be implemented as commands stored in a computer-readable storage medium. When a command is executed by one or more processors (for example, the processor 210'), the one or more processors may execute a function corresponding to the command. The computer-readable storage medium may be, for example, the memory 230'. At least a part of the programming module 300' may be implemented (for example, executed) by the processor 210'. At least a part of the programming module 300' may include, for example, a module, a program, a routine, a set of instructions, and/or a process to execute one or more functions.

The names of components of a programming module according to the present disclosure (for example, the programming module 300') may vary according to the type of an OS. The programming module of the present disclosure may include at least one of the afore-described components, may not include a part of the components, or may include an additional component. Operations of the programming module or other components according to the present disclosure may be performed sequentially, in parallel, repeatedly, or heuristically. Further, a part of the operations may be omitted or a new operation may be added.

Components of hardware described above according to the present disclosure may each include one or more components, and each component's name may vary according to the type of an electronic device. The hardware according to the present disclosure may include at least one of the above-described components, and some may be omitted or may include additional components. Also, some of the components of the hardware according to the present disclosure may be combined into a single entity and perform functions identical or similar to those of the respective components before their combination.

The term "module" as used herein may include its ordinary meaning including, but not limited to, for example, a unit of one, or a combination of two or more, hardware, software or firmware. The term "module" may be used interchangeably with terms such as, for example, unit, logic, logical block, component or circuit. A module may be the smallest unit for performing one or more functions, or a portion thereof. A module may be implemented mechanically, or electronically. For example, a module according to the present disclosure may include at least one of a known, or to-be-developed, Application-Specific Integrated Circuit (ASIC) chip, Field-Programmable Gate Array (FPGA) or programmable logic device that perform certain operations.

A module according to the present disclosure may include one or more of the above-described components, may omit a portion thereof, or may include additional components. Operations that are performed by a module, a programming module or other components according to the present disclosure may be processed in a serial, parallel, repetitive or heuristic manner, and some operations may be omitted or additional operations may be added.

While the disclosure has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable electronic device comprising:
   an external housing including a front plate and a back plate;
   a touchscreen display positioned to be seen through at least a portion of the front plate;
   a processor positioned within the housing, the processor being electrically coupled to the display; and
   a memory positioned within the housing, the memory being electrically coupled to the processor,
   wherein at least a portion of the back plate includes:
      a window forming at least a portion of an external surface of the back plate, the window including a substantially transparent material,
      a polymer film layer adjoining the window, the polymer film layer including a material different from the material of the window, and
      a first UV resin layer adjoining the polymer film layer, the first UV resin layer including a material different from each of the materials of the window and the polymer film layer,
   wherein the first UV resin layer of the back plate includes a repeating lenticular pattern, and
   wherein an interval between subsequent lenticular portions of the repeating lenticular pattern has a distance that is larger than a height of the repeating lenticular pattern.

2. The device of claim 1, wherein the repeating lenticular pattern includes stripes extending in parallel to one another when viewed from above the back plate.

3. The device of claim 1,
   wherein the back plate has a generally rectangular shape that includes a first periphery extending in a first direction and a second periphery extending in a second direction perpendicular to the first direction, and
   wherein the stripes extend substantially across the back plate in the first or second direction.

4. The device of claim 1, wherein the substantially transparent material of the window includes glass.

5. The device of claim 1, wherein the material of the polymer film layer includes a transparent material.

6. The device of claim 1, wherein the material of the first UV resin layer includes a polymeric material.

7. The device of claim 6, wherein the polymeric material includes a material curable using ultraviolet light.

8. The device of claim 6, wherein the polymeric material includes at least one of acrylate or polyurethane.

9. The device of claim 1, wherein the polymer film includes at least one of polyethylene terephthalate (PET), poly methyl methacrylate (PMMA), or poly carbonate (PC).

10. The device of claim 1, wherein the front plate includes glass.

11. The device of claim 10, further comprising one or more sidewalls including a metallic material, the sidewalls surrounding at least portion of a space between the front plate and the back plate.

12. The device of the claim 1,
wherein the front plate includes a first portion including a flat surface and a second portion including a curved surface, and
wherein the display includes a portion seen through the curved surface.

13. The device of the claim 12,
wherein the memory stores instructions that, when executed, cause the processor to display a first user interface through at least a portion of the flat surface, and a second user interface through at least a portion of the curved surface, and
wherein the second user interface is different from the first user interface.

14. The device of the claim 1, wherein the lenticular portions of the repeating lenticular pattern have a rounded shape in cross-section.

15. The device of the claim 14, wherein the rounded shape includes a semi-circle.

16. The device of claim 1, wherein the height of the first UV resin layer at the lenticular pattern is 15 micrometers.

17. The device of claim 1, wherein the height of the first UV resin layer at the lenticular pattern is less than 15 micrometers.

18. The device of claim 1, wherein the interval between subsequent lenticular portions of the repeating lenticular pattern is 75 micrometers.

19. The device of claim 1, wherein the interval between subsequent lenticular portions of the repeating lenticular pattern is more than 75 micrometers.

20. The device of claim 1, wherein the interval between a first highest protruded position of a first lenticular portion and a second highest protruded position of a second lenticular portion neighboring the first lenticular portion is larger than each of a height of the first lenticular portion and a height of the second lenticular portion.

21. The device of claim 1, further comprising;
a second UV resin layer adjoining the first UV resin layer, the second UV resin layer including at least partially reflective material that is different from each of the materials of the window, the polymer film layer, and the first UV resin layer.

22. The device of claim 1, further comprising:
at least one of a deposition layer or a printing layer,
wherein the deposition layer adjoining the first UV resin layer including the repeating lenticular pattern, the deposition layer including a material different from each of the materials of the window, the polymer film layer, and the first UV resin layer, and
wherein the printing layer adjoining the deposition layer, the printing layer including a material different from each of the materials of the window, the polymer film layer, the first UV resin layer, and the deposition layer.

23. The device of claim 22, wherein the deposition layer includes a metallic material.

24. The device of claim 1, further comprising:
a deposition layer adjoining the first UV resin layer including the repeating lenticular pattern, the deposition layer including a material different from each of the materials of the window, the polymer film layer, and the first UV resin layer; and
a printing layer adjoining the deposition layer, the printing layer including a material different from each of the materials of the window, the polymer film layer, the first UV resin layer, and the deposition layer.

* * * * *